(12) United States Patent
Machida

(10) Patent No.: US 11,106,454 B2
(45) Date of Patent: Aug. 31, 2021

(54) SOFTWARE UPDATE CONTROL DEVICE, SOFTWARE UPDATE CONTROL METHOD, AND RECORDING MEDIUM HAVING SOFTWARE UPDATE CONTROL PROGRAM STORED THEREON

(71) Applicant: NEC Corporation, Tokyo (JP)

(72) Inventor: Fumio Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 16/092,511

(22) PCT Filed: Apr. 10, 2017

(86) PCT No.: PCT/JP2017/014685
§ 371 (c)(1),
(2) Date: Oct. 10, 2018

(87) PCT Pub. No.: WO2017/179537
PCT Pub. Date: Oct. 19, 2017

(65) Prior Publication Data
US 2019/0171442 A1    Jun. 6, 2019

(30) Foreign Application Priority Data

Apr. 15, 2016    (JP) .............................. JP2016-081773

(51) Int. Cl.
*G06F 21/00*    (2013.01)
*G06F 8/656*    (2018.01)
(Continued)

(52) U.S. Cl.
CPC ................ *G06F 8/656* (2018.02); *G06F 8/71* (2013.01); *G06F 9/46* (2013.01); *G06F 11/00* (2013.01); *H04L 67/34* (2013.01)

(58) Field of Classification Search
CPC ... G06F 8/656; G06F 8/71; G06F 9/46; G06F 11/00; G06F 9/44; H04L 67/34
(Continued)

(56) References Cited

U.S. PATENT DOCUMENTS 8,392,902 B2 * 3/2013 Reinz ...................... G06F 8/656
717/168
9,152,410 B2 * 10/2015 Khandelwal ............ G06F 8/656
(Continued)

FOREIGN PATENT DOCUMENTS

JP    2007-304845 A    11/2007
JP    2010-108260 A    5/2010
(Continued)

OTHER PUBLICATIONS

Japanese Office Action for JP Application No. 2018-512005 dated Sep. 23, 2020 with English Translation.
(Continued)

*Primary Examiner* — Josnel Jeudy
(74) *Attorney, Agent, or Firm* — Sughrue Mion, PLLC

(57) ABSTRACT

To perform an update process on software reliably without shutting down an edge server in an IoT system, the software update control device 60 is provided with: a first execution control unit 61 which creates, in a second information processing system 80, an operating environment including updated software; a verification unit 62 which verifies operation performed in the operating environment including the updated software; a transfer control unit 63 which transfers an operating environment including the original version of the updated software from a first information processing system 70 to the second information processing system 80; a second execution control unit 64 which causes the second information processing system 80 to execute the updated software; and a switching unit 65 which switches (Continued)

the information to be processed by the second information processing system 80 from information obtained by executing the original software to information obtained by executing the updated software.

10 Claims, 21 Drawing Sheets

(51) Int. Cl.
    *G06F 11/00*     (2006.01)
    *G06F 9/46*     (2006.01)
    *G06F 8/71*     (2018.01)
    *H04L 29/08*     (2006.01)

(58) Field of Classification Search
    USPC ........................................................ 713/168
    See application file for complete search history.

(56) References Cited

U.S. PATENT DOCUMENTS

| | | | |
|---|---|---|---|
| 9,335,986 B1* | 5/2016 | Bowen | G06F 8/656 |
| 9,807,268 B2* | 10/2017 | Yasukawa | H04N 1/00965 |
| 10,157,050 B2* | 12/2018 | Kotani | G06F 11/1433 |
| 2006/0218545 A1* | 9/2006 | Taguchi | G06F 8/656 |
| | | | 717/168 |
| 2008/0134210 A1* | 6/2008 | Georgalas | H04M 15/8278 |
| | | | 719/318 |
| 2009/0083557 A1* | 3/2009 | Ichikawa | G06F 9/5088 |
| | | | 713/310 |
| 2010/0106885 A1 | 4/2010 | Gao et al. | |
| 2010/0115512 A1* | 5/2010 | Sakai | G06F 9/45533 |
| | | | 718/1 |
| 2014/0281473 A1* | 9/2014 | Simmons | G06F 9/4411 |
| | | | 713/100 |
| 2014/0380314 A1* | 12/2014 | Shimada | G06F 9/4856 |
| | | | 718/1 |
| 2015/0134777 A1* | 5/2015 | Onoue | H04L 63/0236 |
| | | | 709/217 |
| 2015/0358334 A1* | 12/2015 | Lantz | H04L 63/12 |
| | | | 726/3 |
| 2015/0363188 A1* | 12/2015 | Tsuchiya | G06F 8/65 |
| | | | 717/173 |
| 2015/0381756 A1* | 12/2015 | Lotfallah | H04L 67/18 |
| | | | 709/213 |
| 2017/0147331 A1* | 5/2017 | Liem | G06F 8/656 |
| 2017/0364346 A1* | 12/2017 | Peng | G06F 13/102 |
| 2018/0341476 A1* | 11/2018 | Kitao | H04L 67/34 |
| 2020/0218580 A1* | 7/2020 | Kim | G06F 9/5077 |

FOREIGN PATENT DOCUMENTS

| | | |
|---|---|---|
| JP | 2011-170528 A | 9/2011 |
| JP | 5293752 B2 | 9/2013 |
| JP | 5667506 B2 | 2/2015 |
| JP | 2015-197838 A | 11/2015 |
| WO | 2013/140524 A1 | 9/2013 |

OTHER PUBLICATIONS

Hiroyuki Tanaka, "Edge Computing and its Application for New Era of IoT", Proceedings of the 2016 IEICE General Conference Tsushin 1, Mar. 1, 2016 (Mar. 1, 2016), ISSN 1349-1369, pp. SS-18 to SS-19, 2 pages.

International Search Report dated Jun. 20, 2017 issued by the International Searching Authority in No. PCT/JP217/014685.

Written Opinion dated Jun. 20, 2017 issued by the International Searching Authority in No. PCT/JP2017/014685.

* cited by examiner

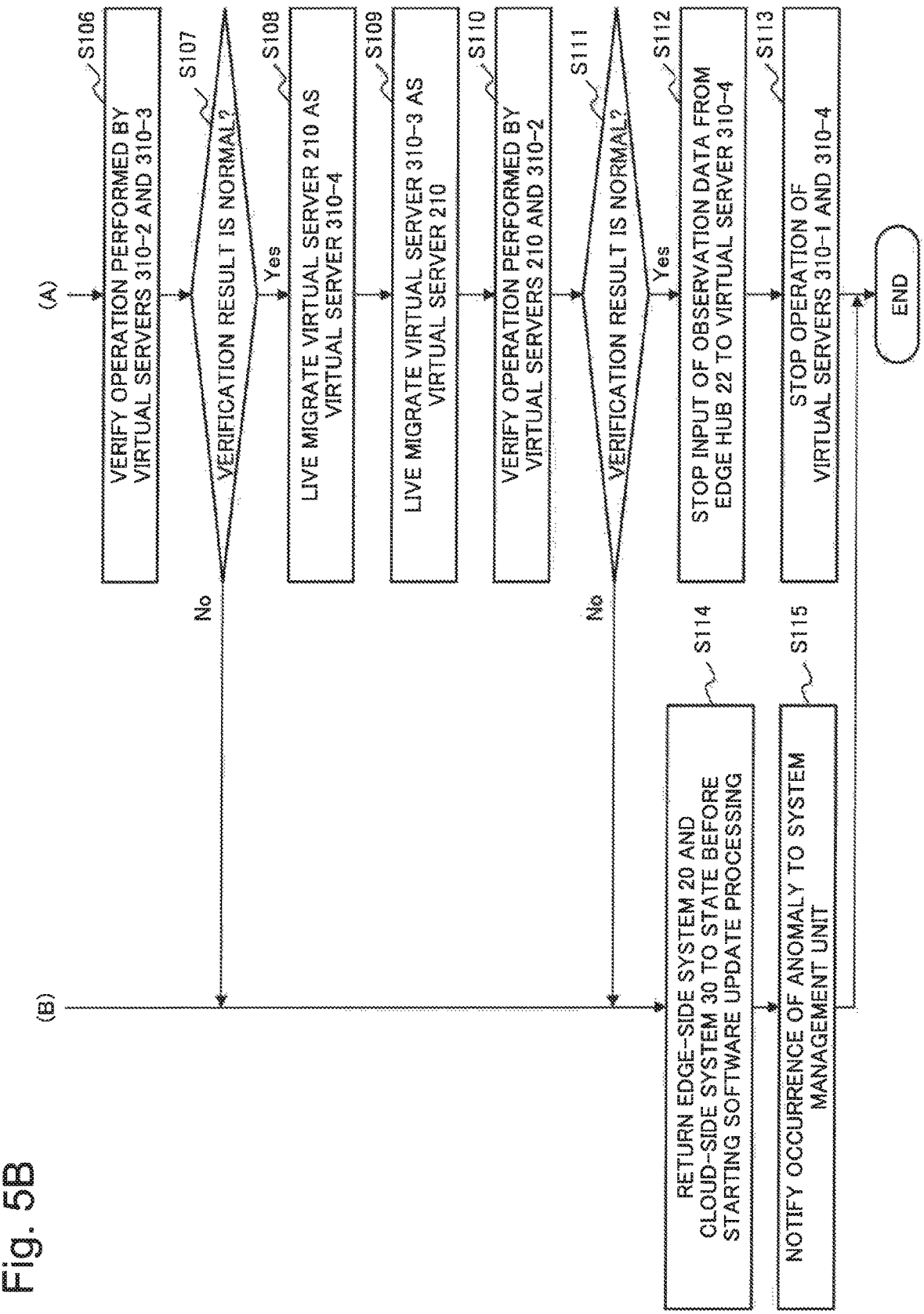

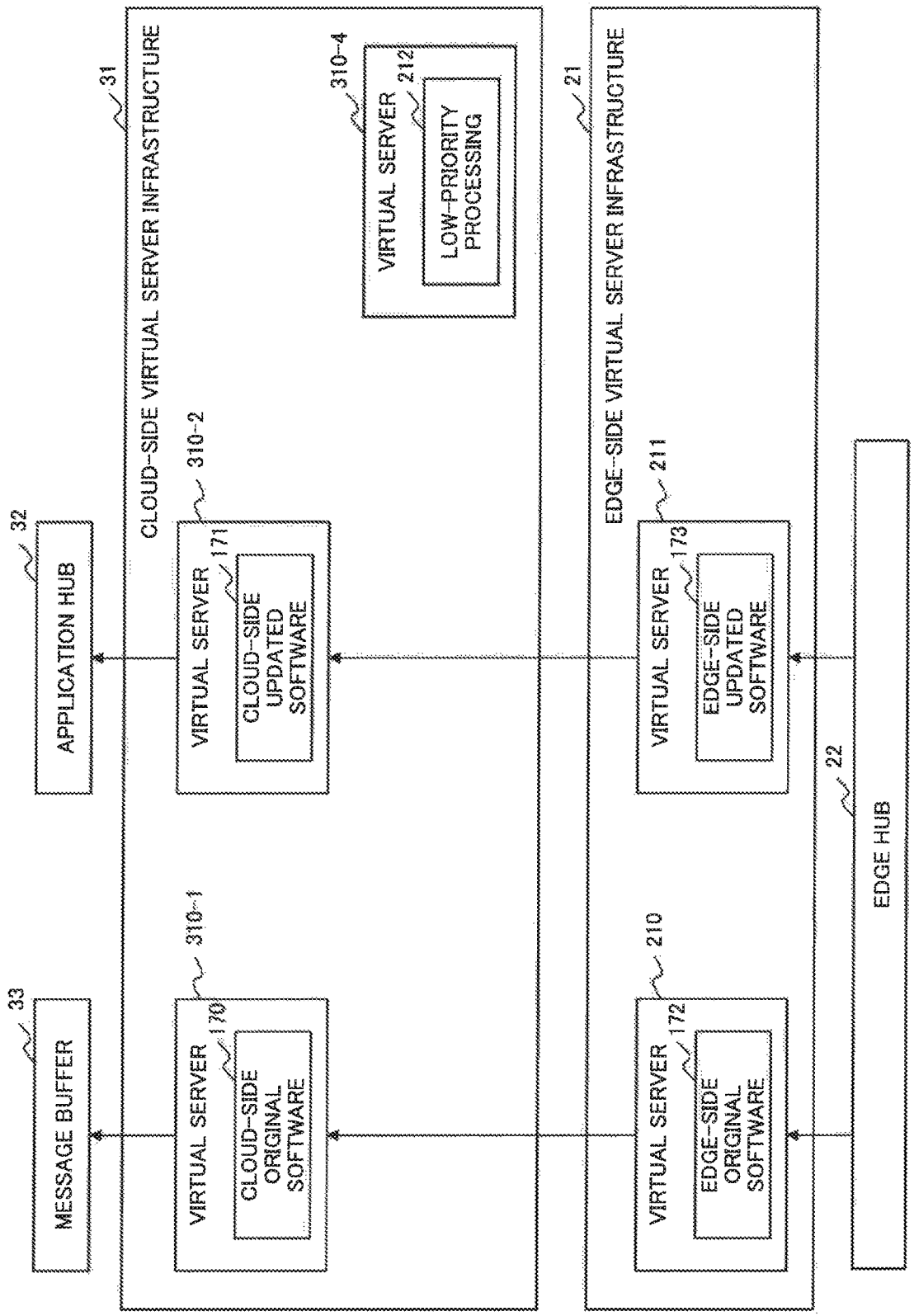

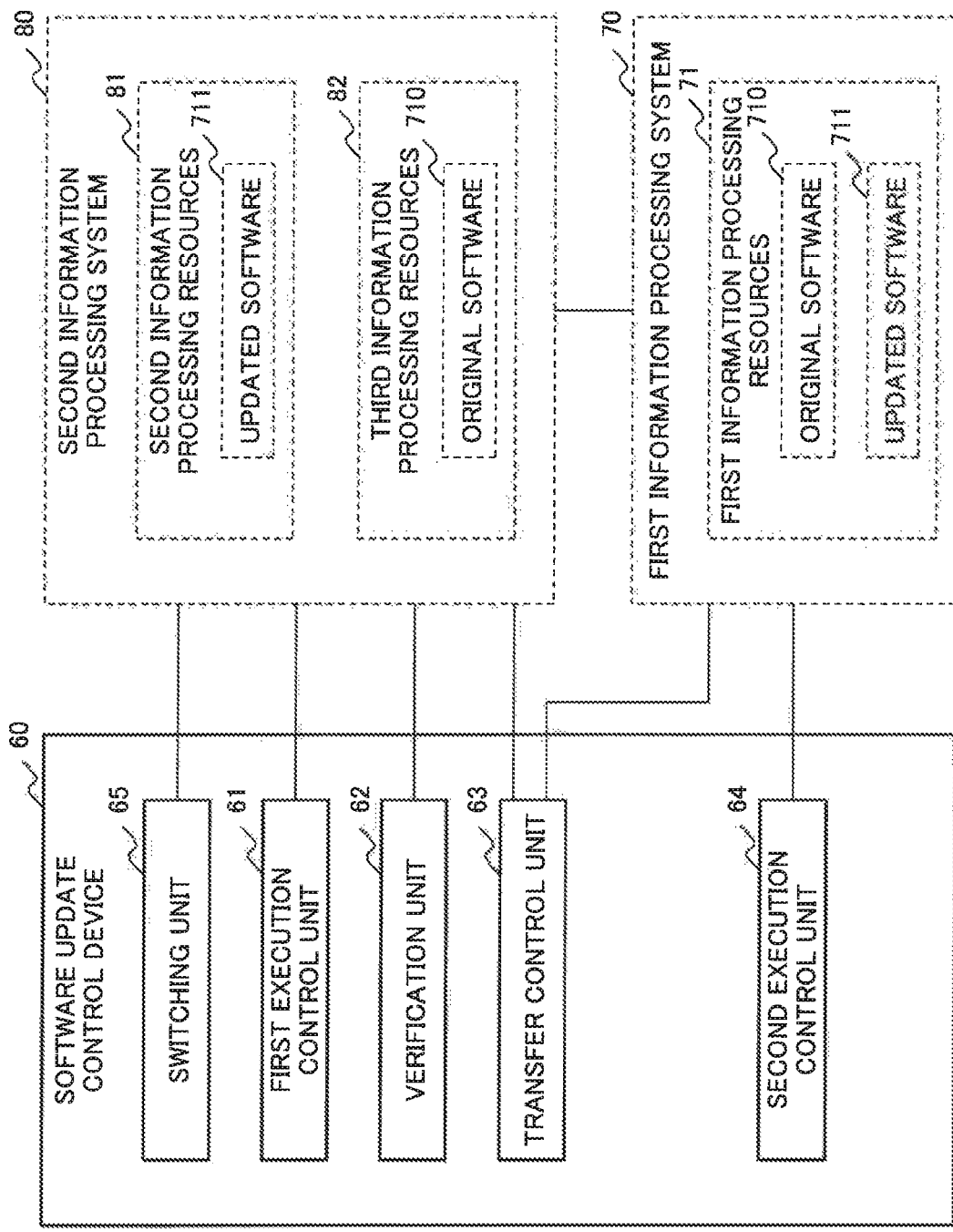

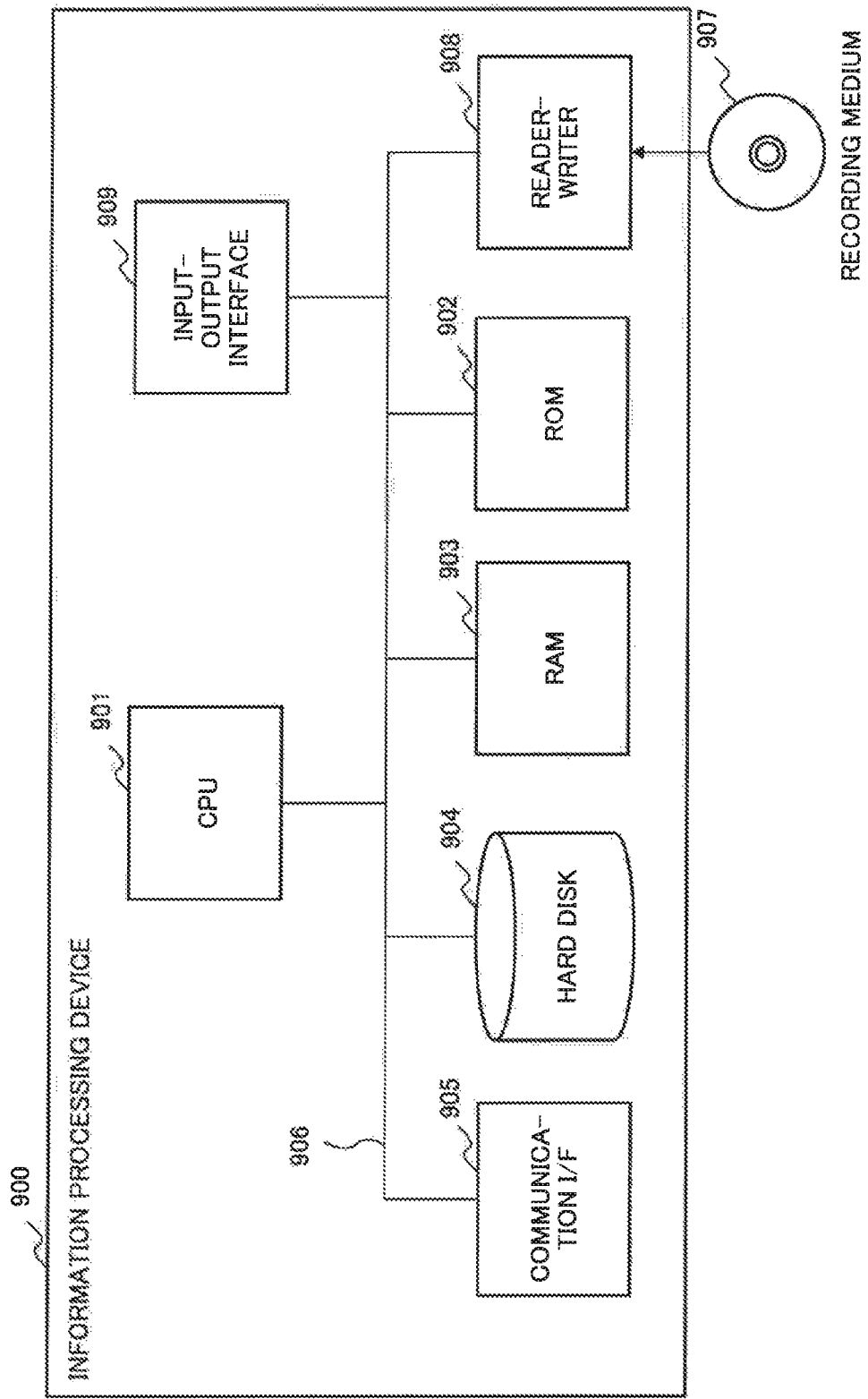

SOFTWARE UPDATE CONTROL DEVICE, SOFTWARE UPDATE CONTROL METHOD, AND RECORDING MEDIUM HAVING SOFTWARE UPDATE CONTROL PROGRAM STORED THEREON

This application is a National Stage Entry of PCT/JP2017/014685 filed on Apr. 10, 2017, which claims priority from Japanese Patent Application 2016-081773 filed on Apr. 15, 2016, the contents of all of which are incorporated herein by reference, in their entirety.

TECHNICAL FIELD

The present invention relates to a technology of an information processing device updating software without stopping an operation of executing the software.

BACKGROUND ART

Various computer systems operate as a basis of a social infrastructure in a modern society being a highly information-oriented society. In such computer systems, software update aiming at function improvement, security measures, or the like is performed. Suspension of computer system operation due to software update, the computer system requiring high-level availability, may have a large influence on the society. Accordingly, a technology of updating software without stopping an operation of a computer system has been expected.

As a technology related to such a technology, PTL 1 discloses a virtual machine system with redundantly configured virtual hardware on which software operates. When updating software operating in the redundant configuration, the system performs control in such a way that, after software operating on virtual hardware on a standby system is updated, processing in a working system is transferred to the standby system.

Further, PTL 2 discloses a software update method of performing fault-tolerant maintenance such as software version upgrade in an information processing system composed of a plurality of systems including multi-staged and multi-layered server clusters load-distributed by a load balancer.

Further, PTL 3 discloses a distributed information processing system including a hypervisor-type virtual machine monitor, a first virtual machine operating on the virtual machine monitor, and a second virtual machine performing software installation or upgrade. After installing updated software on the local machine, the second virtual machine in this system gradually moves an index table saving data storage location information dynamically updated in the first virtual machine, to the local machine. Then, when the move is completed, the system switches processing from the first virtual machine to the second virtual machine.

Further, PTL 4 discloses a control device loading, by use of a core different from a core on which firmware in service operates in a multi-core system, updated firmware into an occupied memory area in the different core. The device checks whether or not the updated firmware normally operates, and then switches processing on the firmware from the core in service to the different core.

Further, PTL 5 discloses a cluster system managing an old cluster before software update and a new cluster after software update, by a load balancer. The system performs control of distributing already accepted processing to the old cluster and a new processing request to the new cluster.

CITATION LIST

Patent Literature

PTL 1: Japanese Unexamined Patent Application Publication No. 2007-304845
PTL 2: Japanese Unexamined Patent Application Publication No. 2015-197838
PTL 3: Japanese Unexamined Patent Application Publication No. 2011-170528
PTL 4: Japanese Patent No. 5293752
PTL 5: Japanese Patent No. 5667506

SUMMARY OF INVENTION

Technical Problem

Utilization of an Internet of Things (IoT) system performing prediction, control, and the like by aggregating, through a network, digital data generated by devices such as a sensor and a camera, and performing analysis or status visualization on the aggregated data has become widespread. Such an IoT system performs integrated management on many devices and therefore generally takes a form of performing intensive computation processing by gathering data on a cloud system side such as a data center. However, as an amount of data to be handled becomes enormous with increase in a number of devices connected to the network, it becomes inefficient for the cloud system side to perform every processing.

In response to such a problem, an edge-type system in which a computer server called an edge server (hereinafter referred to as an "edge") is installed at a location near a device being a data source, and the edge executes part of data processing has been used. For example, data traffic to a cloud system may be reduced by an edge compiling data gathered from many devices and transferring only the compilation result to the cloud system. Further, in a system required to perform real-time control on the basis of gathered data, or the like, making a control determination by an edge allows for more suppression of delay in control and therefore provides highly accurate control.

Such an edge-type IoT system may update software executed by an edge. In such a case, an issue with an IoT system having a stringent requirement on availability is to perform software update processing without stopping an operation of the IoT system after confirming that updated software executed by an edge operates normally in coordination with a cloud system. For example, the aforementioned Patent Literature presents a technology providing fault tolerance when software is updated, by use of a multiplexed system such as redundancy. However, there is a problem that, since computer resources (information processing resources) included in an edge are usually limited in an edge-type IoT system, it is difficult to apply a fault-tolerant update technology based on multiplexing to update of software executed by the edge. PTLs 1 to 5 do not mention the problem. A main object of the present invention is to provide a software update control device and the like that resolve the problem.

Solution to Problem

A software update control device according to an aspect of the present invention includes: a first execution control means for performing control in such a way that, when a second information processing system processes original output information output by first information processing resources included in a first information processing system executing software before update, second information processing resources included in the second information processing system execute the software being updated; a verification means for verifying a trial operation in which the second information processing system processes information output by the second information processing resources executing the updated software; a transfer control means for performing control in such a way that, when a verification result by the verification means with respect to the trial operation indicates being normal, a state of outputting the original output information is transferred from the first information processing resources to third information processing resources included in the second information processing system, and the second information processing system is able to process the original output information output by the third information processing resources; a second execution control means for performing control in such a way that, after processing by the transfer control means is performed, the first information processing resources output updated output information by executing the updated software; and a switching means for switching processing target information being a processing target of the second information processing system, from the original output information output by the first or third information processing resources, to the updated output information output by the first or second information processing resources.

From another viewpoint of achieving the aforementioned object, a software update control method according to an aspect of the present invention includes, by an information processing device: performing control in such a way that, when a second information processing system processes original output information output by first information processing resources included in a first information processing system executing software before update, second information processing resources included in the second information processing system execute the software being updated; verifying a trial operation in which the second information processing system processes information output by the second information processing resources executing the updated software; performing control in such a way that, when a verification result with respect to the trial operation indicates being normal, a state of outputting the original output information is transferred from the first information processing resources to third information processing resources included in the second information processing system, and the second information processing system is able to process the original output information output by the third information processing resources; performing control in such a way that, after entering a state in which the second information processing system is able to process the original output information output from the third information processing resources, the first information processing resources output updated output information by executing the updated software; and switching processing target information being a processing target of the second information processing system, from the original output information output by the first or third information processing resources, to the updated output information output by the first or second information processing resources.

Further, from yet another viewpoint of achieving the aforementioned object, a software update control program according to an aspect of the present invention is a program causing a computer to execute: first execution control processing of performing control in such a way that, when a second information processing system processes original output information output by first information processing resources included in a first information processing system executing software before update, second information processing resources included in the second information processing system execute the software being updated; verification processing of verifying a trial operation in which the second information processing system processes information output by the second information processing resources executing the updated software; transfer control processing of performing control in such a way that, when a verification result by the verification processing with respect to the trial operation indicates being normal, a state of outputting the original output information is transferred from the first information processing resources to third information processing resources included in the second information processing system, and the second information processing system is able to process the original output information output by the third information processing resources; second execution control processing of performing control in such a way that, after processing by the transfer control processing is performed, the first information processing resources output updated output information by executing the updated software; and switching processing of switching processing target information being a processing target of the second information processing system, from the original output information output by the first or third information processing resources, to the updated output information output by the first or second information processing resources.

Furthermore, the present invention may be provided by a computer-readable, non-transitory recording medium storing such a software update control program (computer program).

Advantageous Effects of Invention

The present invention is able to reliably perform update processing of software executed by an information processing device including only limited information processing resources, such as an edge server in an IoT system, without stopping the information processing device.

BRIEF DESCRIPTION OF DRAWINGS

FIG. 5B is a flowchart (2/2) illustrating the operation of the software update control device 10 according to the first example embodiment of the present invention.

FIG. 9 is a diagram exemplifying a state of each system after the update of the software executed by the edge-side system 20 and the cloud-side system 30, according to the third example embodiment of the present invention.

FIG. 16 is a block diagram illustrating a configuration of a software update control device 60 according to a sixth example embodiment of the present invention.

FIG. 17 is a block diagram illustrating a configuration of an information processing device capable of providing the software update control devices according to the respective example embodiments of the present invention.

EXAMPLE EMBODIMENT

Example embodiments of the present invention will be described in detail below with reference to drawings.

First Example Embodiment

Figure 1:
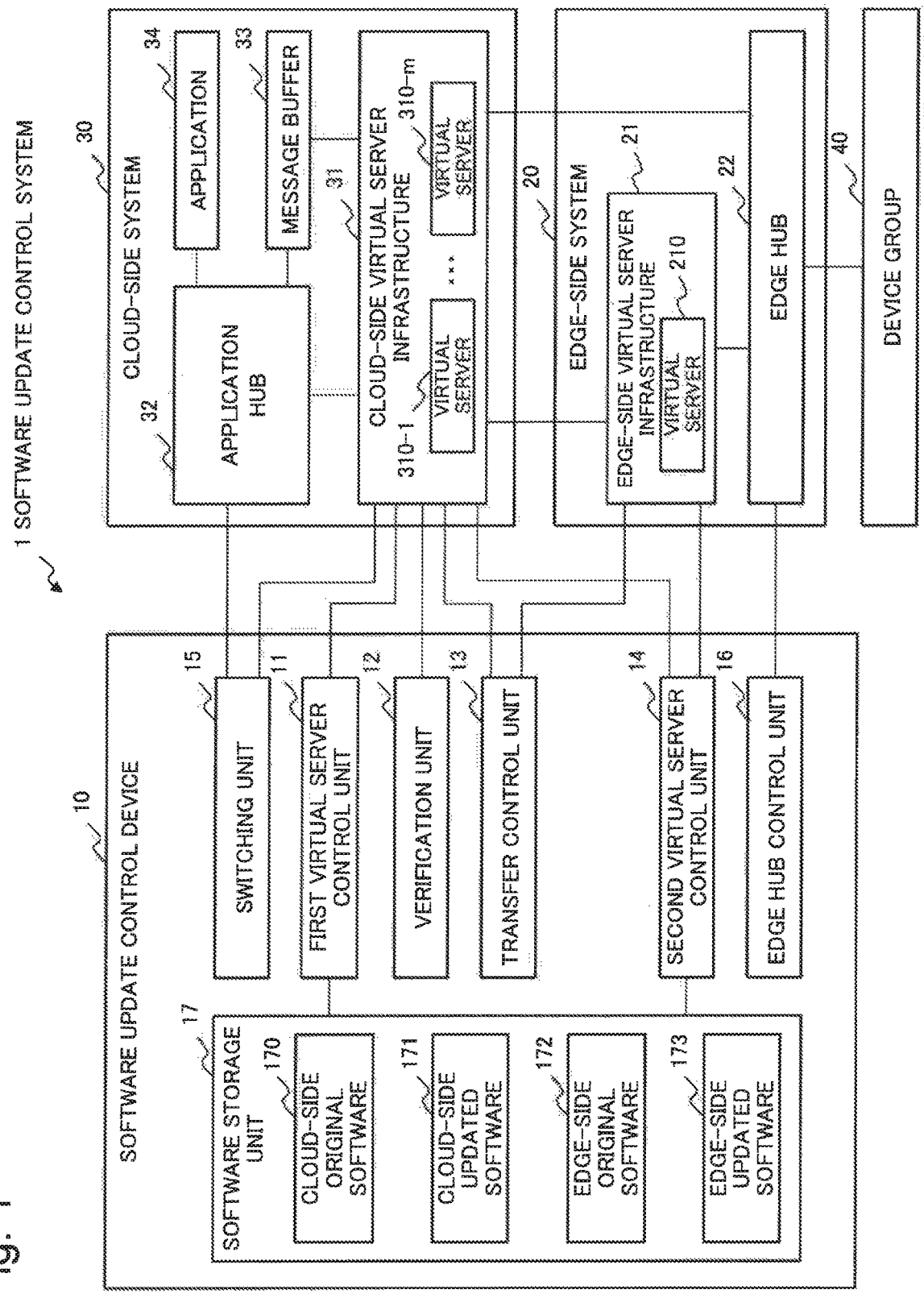
FIG. 1 is a block diagram illustrating a configuration of a software update control system 1 according to a first example embodiment of the present invention.

FIG. 1 is a block diagram conceptually illustrating a configuration of a software update control system 1 according to a first example embodiment of the present invention. For example, the software update control system 1 is a system updating software executed by an edge in an IoT system. Roughly classifying, the software update control system 1 includes a software update control device 10, an edge-side system 20, a cloud-side system 30, and a device group 40.

For example, the device group 40 is a device group including a sensor and a camera, and generates and outputs observation data indicating a result of observing an observation target.

The edge-side system 20 (first information processing system) is an information processing device such as an edge server and includes an edge-side virtual server infrastructure 21 and an edge hub 22. The edge hub 22 is communicably connected to the device group 40 and receives observation data output by the device group 40. The edge-side virtual server infrastructure 21 is an infrastructure capable of executing a virtual server 210 and includes hardware (e.g. a configuration as described later with reference to FIG. 17) such as a processor and a memory, and software (unillustrated) such as a hypervisor (software controlling execution of a virtual server). The virtual server 210 processes observation data received by the edge hub 22, as processing target data, and then transmits the processing target data to the communicably connected cloud-side system 30. Since an amount of hardware, such as a processor and a memory, included in the edge-side system 20 is small, it is assumed that a number of virtual servers that can be executed by the edge-side virtual server infrastructure 21 is limitative.

For example, the cloud-side system 30 (second information processing system) is a system including many information processing device, the system being installed as a data center, and includes a cloud-side virtual server infrastructure 31, an application hub 32, and a message buffer 33. The cloud-side virtual server infrastructure 31 is an infrastructure capable of executing virtual servers 310-1 to 310-m (where m is any natural number) and includes hardware (e.g. a configuration as described later with reference to FIG. 17) such as a processor and a memory, and software (unillustrated) such as a hypervisor. The virtual servers 310-1 to 310-m perform predetermined processing on processing target data transmitted from the edge-side system 20.

The cloud-side system 30 executes an application 34. The application 34 provides a service using processing target data processed by the virtual servers 310-1 to 310-m. For example, the application 34 performs information analysis or system control based on the processing target data. The processing target data are input to the application 34 through the application hub 32. The application hub 32 is also connected to the message buffer 33. The message buffer 33 is a device such as an electronic memory, the device being capable of temporarily storing data output by the virtual servers 310-1 to 310-m. The application hub 32 selects either data output by the virtual servers 310-1 to 310-m or data stored in the message buffer 33, in accordance with external control, and inputs the selected data to the application 34.

The software update control device 10 is a device controlling update processing on software executed by the virtual server 210 and software executed by the virtual servers 310-1 to 310-m. The software update control device 10 is communicably connected to the edge-side system 20 and the cloud-side system 30.

The software update control device 10 includes a first virtual server control unit 11, a verification unit 12, a transfer control unit 13, a second virtual server control unit 14, a switching unit 15, an edge hub control unit 16, and a software storage unit 17.

The software storage unit 17 stores cloud-side original software 170, cloud-side updated software 171, edge-side original software 172, and edge-side updated software 173.

The cloud-side original software 170 is software before update and is executed by the virtual servers 310-1 to 310-*m*. The cloud-side updated software 171 is updated software executed by the virtual servers 310-1 to 310-*m*. The edge-side original software 172 is software before update and is executed by the virtual server 210. The edge-side updated software 173 is updated software executed by the virtual server 210.

Figure 2:
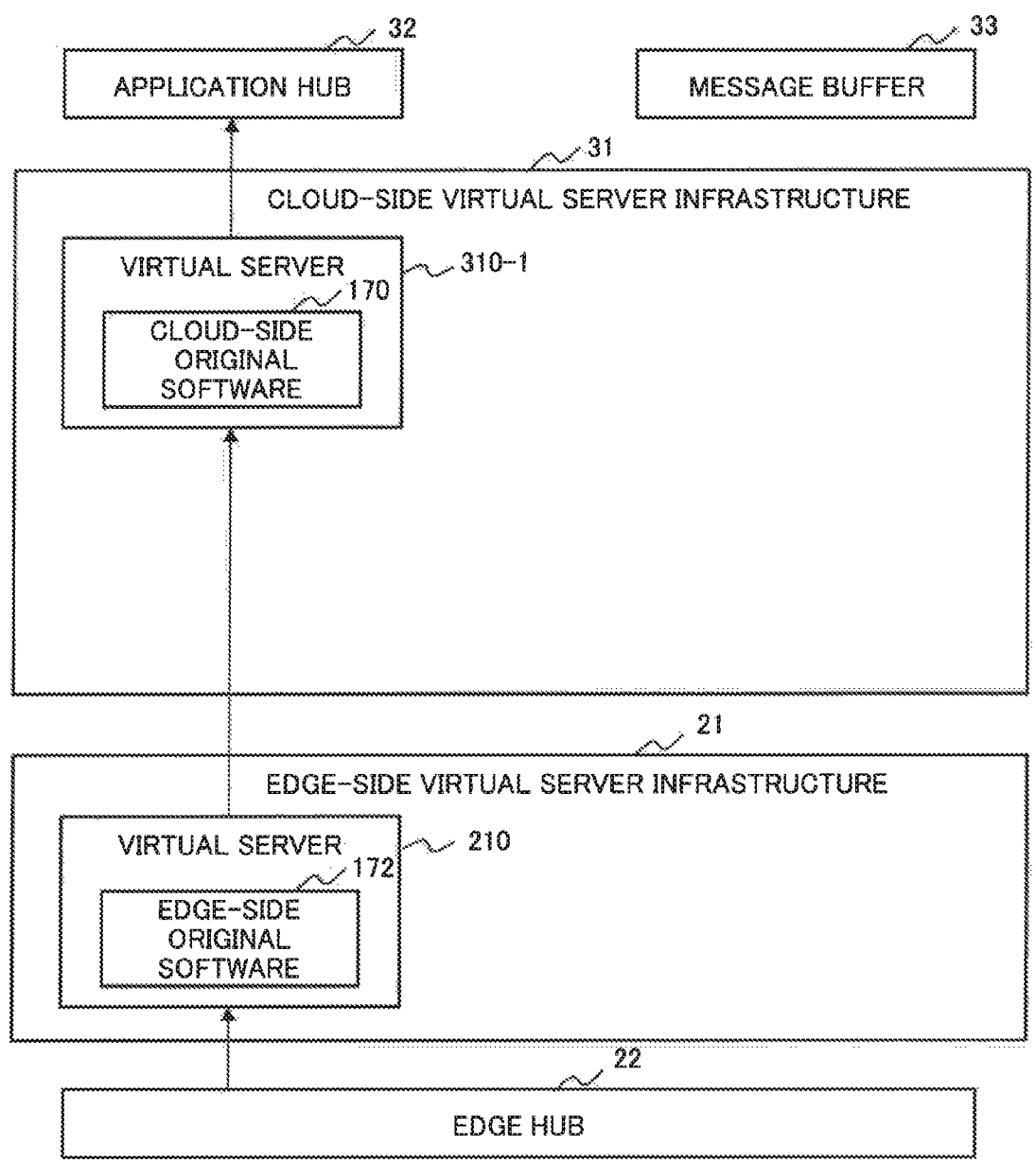
FIG. 2 is a diagram exemplifying a state of each system before update of software executed by an edge-side system 20 and a cloud-side system 30, according to the first example embodiment of the present invention.

FIG. 2 is a diagram exemplifying a state of each system before update of software executed by the edge-side system 20 and the cloud-side system 30, according to the present example embodiment. As exemplified in FIG. 2, by executing the edge-side original software 172, the virtual server 210 (first information processing resources) processes observation data input from the edge hub 22 (data reception unit) and inputs processing target data being the processing result to the virtual server 310-1. By executing the cloud-side original software 170, the virtual server 310-1 processes processing target data input from the virtual server 210 and inputs processing target data being the processing result to the application hub 32.

In the state illustrated in FIG. 2, the software update control device 10 illustrated in FIG. 1 starts processing of updating the software executed by the edge-side system 20 and the cloud-side system 30 to the edge-side updated software 173 and the cloud-side updated software 171.

Figure 3:
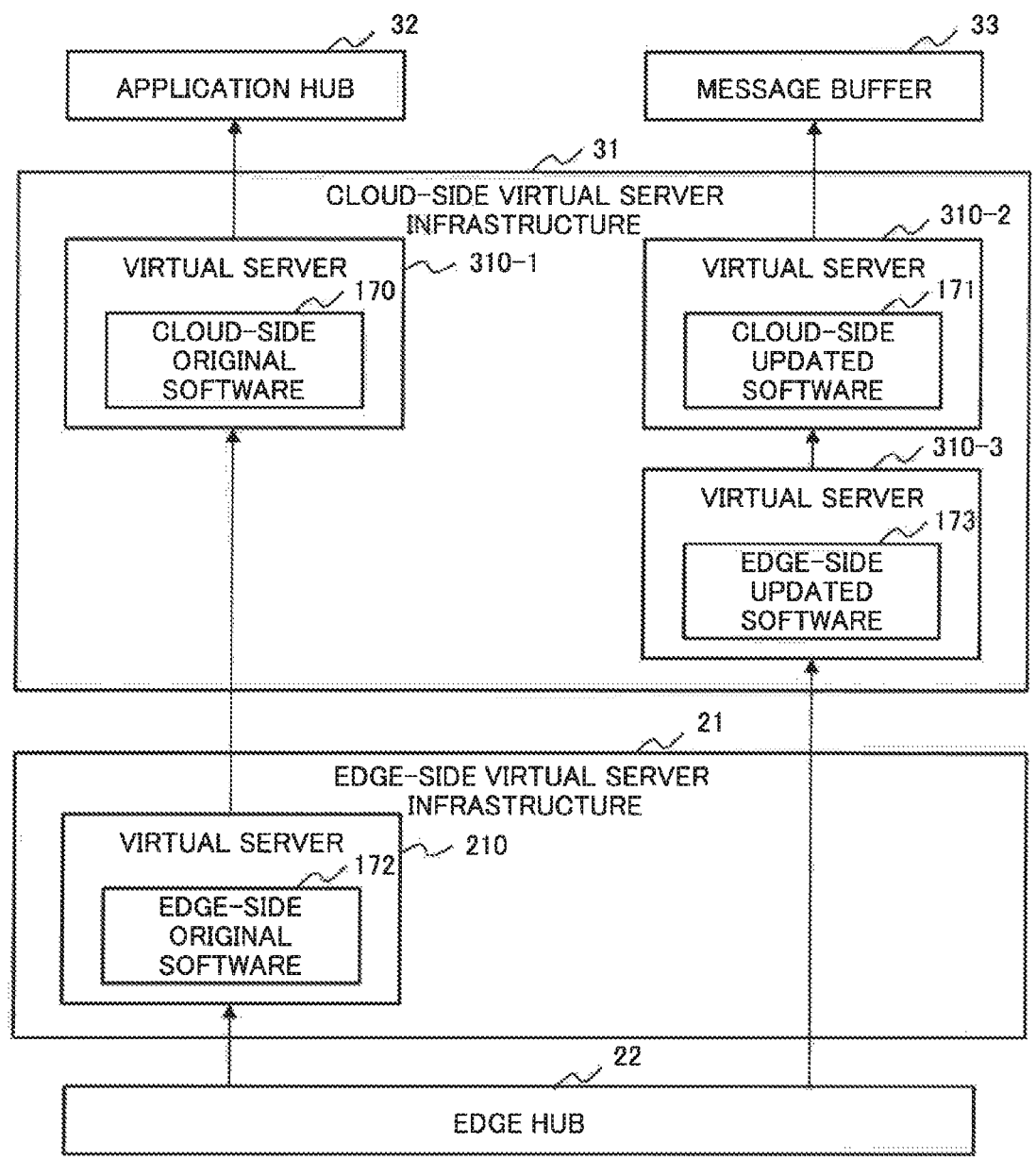
FIG. 3 is a diagram exemplifying a state of each system during the update of the software executed by the edge-side system 20 and the cloud-side system 30, according to the first example embodiment of the present invention.

FIG. 3 is a diagram exemplifying a state of each system during the update of the software executed by the edge-side system 20 and the cloud-side system 30, according to the present example embodiment. As illustrated in FIG. 3, by controlling the cloud-side virtual server infrastructure 31, the first virtual server control unit 11 (first execution control unit) illustrated in FIG. 1 newly boots up the virtual server 310-2 and the virtual server 310-3 (second information processing resources). The first virtual server control unit 11 reads the cloud-side updated software 171 and the edge-side updated software 173 from the software storage unit 17 and performs control in such a way that the virtual servers 310-2 and 310-3 execute the read software, respectively.

When the first virtual server control unit 11 performs the aforementioned processing, the edge hub control unit 16 (data reception unit control unit) illustrated in FIG. 1 performs control in such a way that the edge hub 22 copies observation data received from the device group 40 and inputs the copied observation data to the virtual server 310-3. Consequently, as illustrated in FIG. 3, an environment for processing observation data by the updated software (performing a trial operation) is constructed in the cloud-side virtual server infrastructure 31.

The verification unit 12 illustrated in FIG. 1 verifies whether or not a trial operation in which the virtual server 310-2 processes processing target data is normal, the processing target data being output as a result of the virtual server 310-3 processing observation data. For example, it is assumed that a determination criterion required for the verification is given to the verification unit 12 by a system administrator or the like in advance, and the verification unit 12 performs the aforementioned verification in accordance with the determination criterion. The verification unit 12 continues to verify the processing by the edge-side system 20 and the cloud-side system 30 even after the software update processing is completed and the edge-side system 20 and the cloud-side system 30 start processing observation data by executing the updated software. When the verification result indicates abnormal, the verification unit 12 notifies occurrence of the anomaly to a system management unit (unillustrated) managing failure occurrence status and the like in the software update control system 1.

Figure 4:
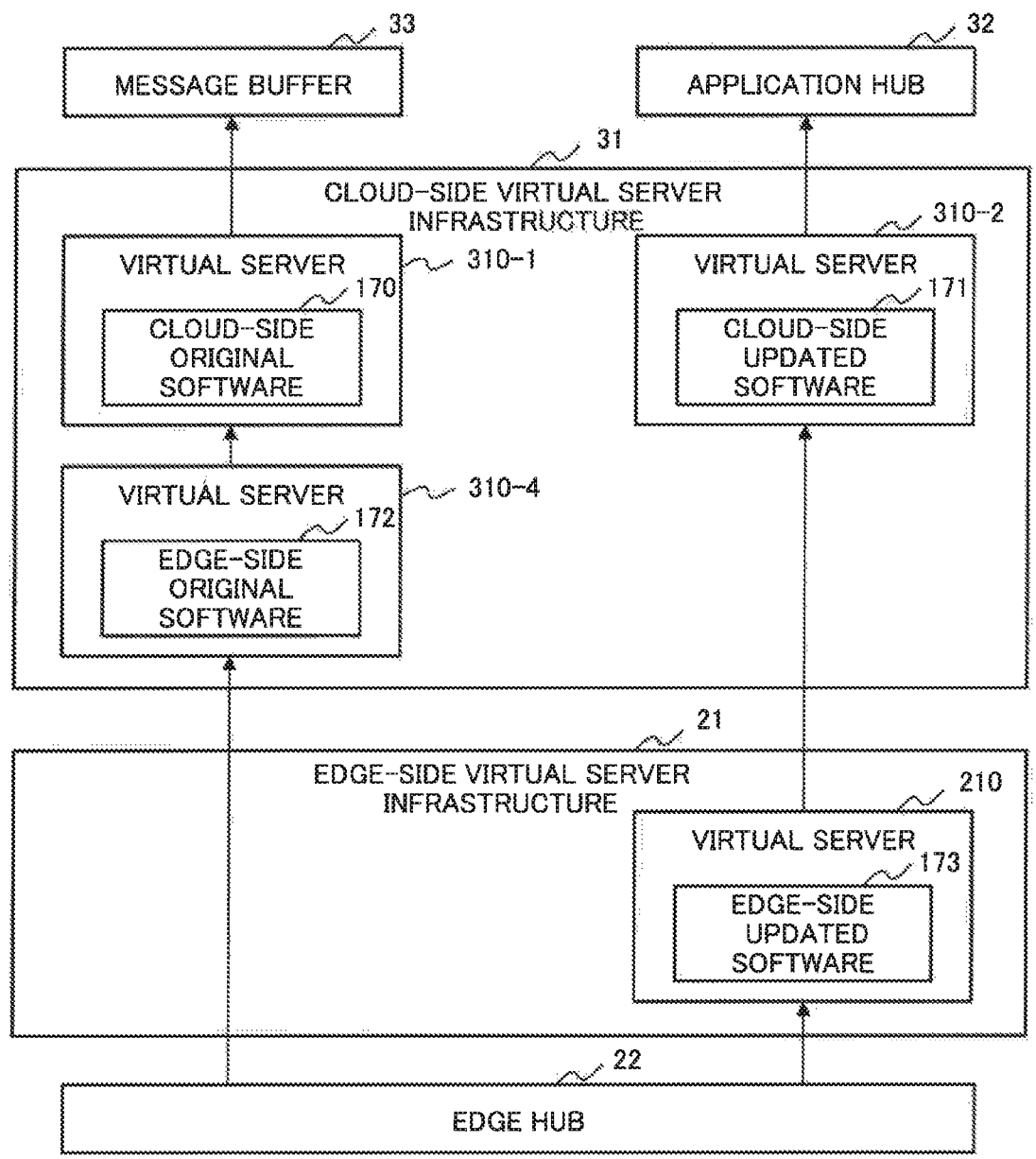
FIG. 4 is a diagram exemplifying a state of each system after the update of the software executed by the edge-side system 20 and the cloud-side system 30, according to the first example embodiment of the present invention.

FIG. 4 is a diagram exemplifying a state of each system after the update of the software executed by the edge-side system 20 and the cloud-side system 30, according to the present example embodiment. When a verification result by the verification unit 12 indicates normal, the transfer control unit 13 illustrated in FIG. 1 live migrates the virtual server 210 to the cloud-side virtual server infrastructure 31 as the virtual server 310-4 (third information processing resources) by controlling the edge-side virtual server infrastructure 21 and the cloud-side virtual server infrastructure 31, as illustrated in FIGS. 3 and 4. The live migration is an existing technology of moving an operating environment of a virtual server to a different physical system without stopping operation of the virtual server, and it is assumed that the live migration function is implemented on the edge-side virtual server infrastructure 21 and the cloud-side virtual server infrastructure 31. Processing target data output by the virtual server 310-4 are input to the virtual server 310-1 by the live migration, and therefore even after the live migration is performed, an environment for processing observation data by the original software is maintained in the cloud-side virtual server infrastructure 31.

After processing by the transfer control unit 13 is performed, the second virtual server control unit 14 illustrated in FIG. 1 live migrates the virtual server 310-3 to the edge-side virtual server infrastructure 21 as a new virtual server 210 by controlling the edge-side virtual server infrastructure 21 and the cloud-side virtual server infrastructure 31, as illustrated in FIGS. 3 and 4. Processing target data output by the virtual server 210 are input to the virtual server 310-2 by the live migration. Accordingly, even after the live migration is performed, an environment for processing observation data by the updated software is maintained in the edge-side virtual server infrastructure 21 and the cloud-side virtual server infrastructure 31.

By controlling the cloud-side virtual server infrastructure 31, the switching unit 15 illustrated in FIG. 1 switches information input to the application hub 32, from information output by the virtual server 310-1 to information output by the virtual server 310-2, as exemplified in FIGS. 3 and 4. Consequently, the information input to the application hub 32 switches from information obtained by processing observation data by the original software (original output information) to information obtained by processing observation data by the updated software (updated output information).

Along with the aforementioned switching of the input to the application hub 32, the switching unit 15 inputs to the message buffer 33 information (original output information) output by the virtual server 310-1, as exemplified in FIGS. 3 and 4. Specifically, after the software update processing is completed and the edge-side system 20 and the cloud-side system 30 start processing observation data by executing the updated software, the message buffer 33 stores original output information generated by the virtual servers 310-1 and 310-4.

When a verification result by the verification unit 12 indicates abnormal after software update processing is completed, the switching unit 15 switches information input to the application 34 from updated output information output by the virtual server 310-2 to original output information stored in the message buffer 33, by controlling the application hub 32. Consequently, an environment for processing observation data by the edge-side system 20 and the cloud-side system 30 returns to an environment before the software update.

After software update processing is completed, operation of the virtual servers 310-1 and 310-4 (i.e. an environment for executing the original software) illustrated in FIG. 4 is stopped by the first virtual server control unit 11 at a timing when, for example, a verification result by the verification unit 12 indicates normal over a predetermined time period.

Next, an operation (processing) of the software update control device 10 according to the present example embodiment will be described in detail with reference to flowcharts in FIGS. 5A and 5B.

The first virtual server control unit 11 starts the virtual servers 310-2 and 310-3, and causes the servers to execute the cloud-side updated software 171 and the edge-side updated software 173, respectively (Step S101). The edge hub control unit 16 performs control in such a way that the edge hub 22 copies observation data received from the device group 40 and inputs the copied observation data to the virtual server 310-3 (Step S102). The verification unit 12 verifies a trial operation performed by the virtual servers 310-2 and 310-3 (Step S103).

When the verification result by the verification unit 12 is abnormal (No in Step S104), the software update control device 10 returns the edge-side system 20 and the cloud-side system 30 to a state before starting the software update processing (Step S114). The verification unit 12 notifies occurrence of the anomaly to the system management unit, and the entire processing ends.

When the verification result by the verification unit 12 is normal, (Yes in Step S104), the switching unit 15 switches an output by the virtual server 310-1 to the message buffer 33 and connects an output by the virtual server 310-2 to the application hub 32 (Step S105). The verification unit 12 verifies an operation performed by the virtual servers 310-2 and 310-3 (Step S106).

When the verification result by the verification unit 12 is abnormal (No in Step S107), the processing advances to Step S114. When the verification result by the verification unit 12 is normal (Yes in Step S107), the transfer control unit 13 live migrates the virtual server 210 as the virtual server 310-4 (Step S108). The second virtual server control unit 14 live migrates the virtual server 310-3 as a new virtual server 210 (Step S109). The verification unit 12 verifies an operation performed by the virtual servers 210 and 310-2 (Step S110).

When the verification result by the verification unit 12 is abnormal (No in Step S111), the processing advances to Step S114. When the verification result by the verification unit 12 is normal (Yes in Step S111), the edge hub control unit 16 stops input of observation data from the edge hub 22 to the virtual server 310-4 (Step S112). The first virtual server control unit 11 stops operation of the virtual servers 310-1 and 310-4 (Step S113), and the entire processing ends.

The software update control device 10 according to the present example embodiment is able to reliably perform update processing of software executed by an information processing device including only limited information processing resources, such as an edge server in an IoT system, without stopping the information processing device. The reason is that the software update control device 10 constructs an entire operating environment after the software update in the cloud-side system 30, verifies an operation thereof, and then performs control in such a way that an operating environment before the software update in the edge-side system 20 is moved to the cloud-side system 30, and also the edge-side system 20 executes the updated software.

Effects provided by the software update control device 10 according to the present example embodiment will be described in detail below.

When updating software executed by an edge in an IoT system to be needed a stringent requirement on availability, or the like, it is an issue to perform software update processing without stopping operation of the IoT system. Then, at that time, it is desirable to confirm that updated software executed by the edge operates normally in coordination with a cloud system. For example, a technology of providing, by use of a multiplexed system such as redundancy, fault tolerance when software update is performed exists as an existing technology. However, there is a problem with an edge-type IoT system or the like that computer resources included in the edge are normally limited, and therefore it is difficult to apply a fault-tolerant update technology based on multiplexing to update of software executed by the edge.

In response to such a problem, when the cloud-side system 30 processes original output information output by the virtual server 210 executing the edge-side original software 172, the first virtual server control unit 11 performs control in such a way that the virtual server 310-3 executes the edge-side updated software 173, in the software update control device 10 according to the present example embodiment. The verification unit 12 verifies a trial operation in which the cloud-side system 30 processes updated output information output by the virtual server 310-3 executing the edge-side updated software 173. When a verification result by the verification unit 12 indicates normal, the transfer control unit 13 performs control in such a way that a state of the virtual server 210 executing the edge-side original software 172 is transferred to the virtual server 310-4, and the cloud-side system 30 is able to process original output information output by the virtual server 310-4. After the processing by the transfer control unit 13 is performed, the second virtual server control unit 14 performs control in such a way that the virtual server 210 outputs updated output information by executing the edge-side updated software 173. The switching unit 15 switches processing target information being a processing target of the cloud-side system 30, from the original output information output by the virtual server 210 to the updated output information output by the virtual server 310-3.

In other words, the software update control device 10 according to the present example embodiment verifies updated software by use of the cloud-side system 30 including a large amount of information processing resources. Then, the software update control device 10 performs control in such a way that an execution environment of the original software is moved to the cloud-side system 30, and the edge-side system 20 starts execution of the updated software, without stopping operation of each system. Consequently, the software update control device 10 according to the present example embodiment is able to reliably perform update processing of software executed by an information processing device including only limited information processing resources, such as an edge server in an IoT system, without stopping the information processing device.

Further, the software update control device 10 according to the present example embodiment performs control in such a way that an execution environment of original software is kept in the cloud-side system 30 for at least a predetermined period after software update is performed, and a result acquired by the execution environment of the original software is stored in the message buffer 33. When an anomaly occurs in processing by updated software, the software update control device 10 is able to return the system to a state before the software update by performing control in such a way that the cloud-side system 30 uses information stored in the message buffer 33 as processing target information. Accordingly, the software update control device 10 according to the present example embodiment is able to improve availability of the system.

A control target of the software update control device 10 according to the present example embodiment is not limited to a virtual server. For example, by use of a technology of performing migration between physical servers, the software update control device 10 may perform the aforementioned processing on physical servers included in the edge-side system 20 and the cloud-side system 30.

Further, a control target of the software update control device 10 according to the present example embodiment is not limited to an IoT system composed of an edge-side system and a cloud-side system that process observation data generated by a device group. For example, the software update control device 10 may perform the aforementioned processing when updating software in a system including a plurality of small-scale servers performing distributed processing on a specific application and a large-scale server controlling the small-scale servers.

Second Example Embodiment

Figure 6A:
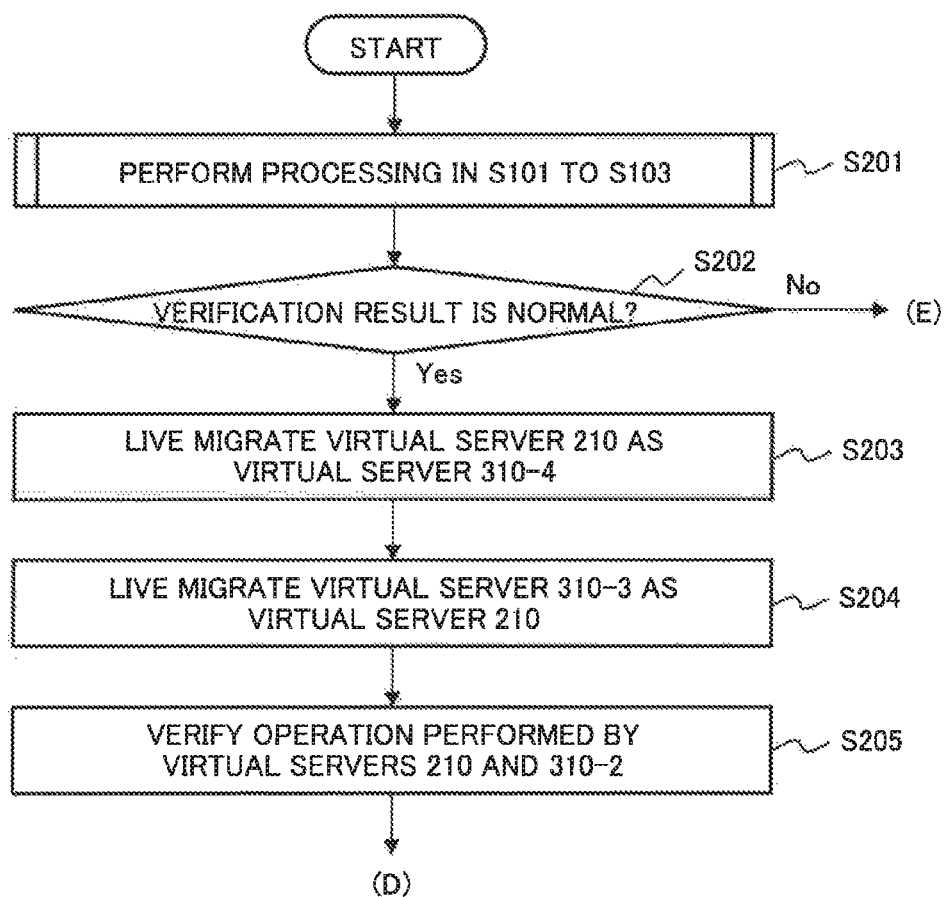
FIG. 6A is a flowchart (1/2) illustrating an operation of a software update control device 10 according to a second example embodiment of the present invention.
Figure 6B:
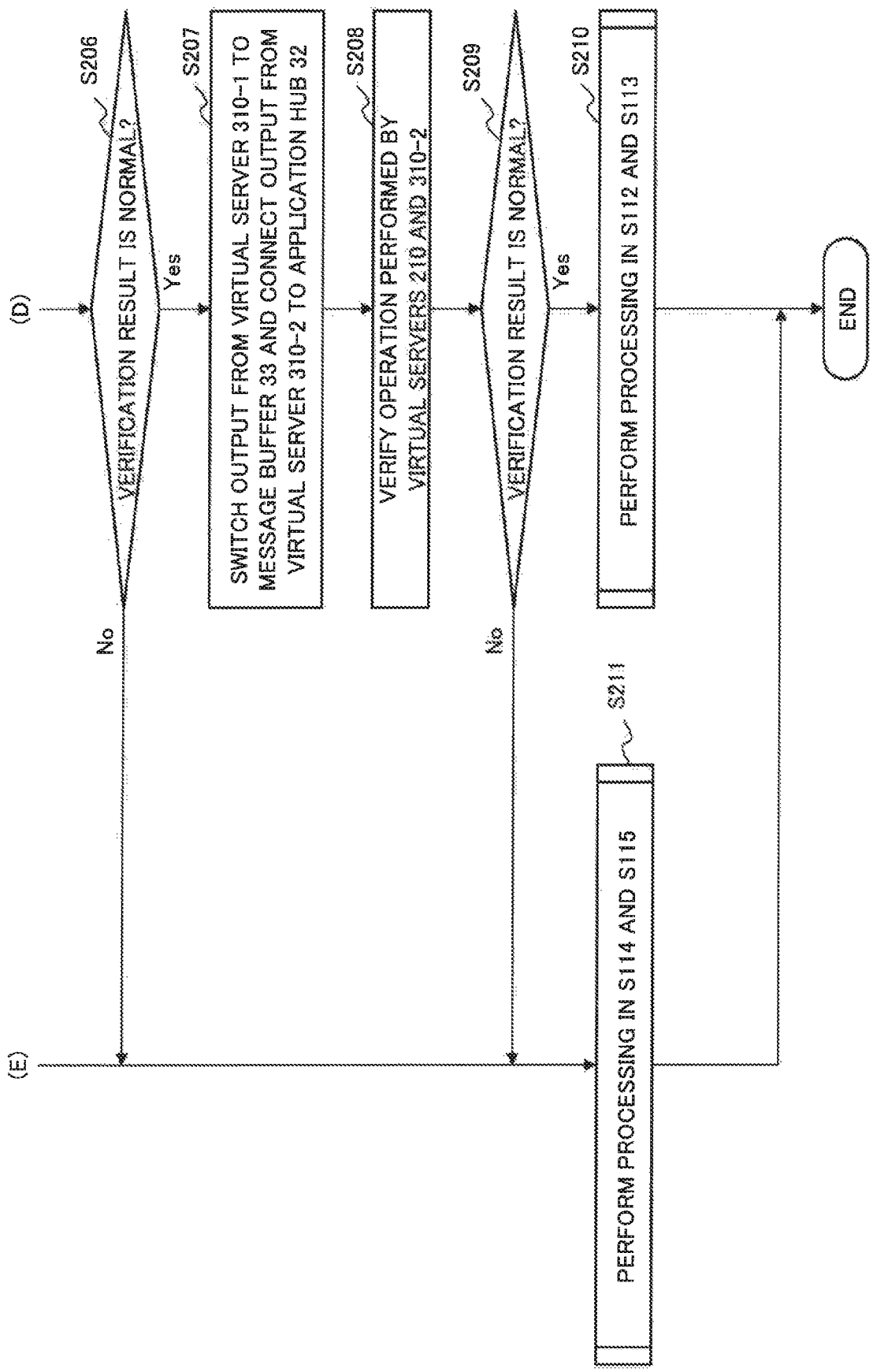
FIG. 6B is a flowchart (2/2) illustrating the operation of the software update control device 10 according to the second example embodiment of the present invention.

Next, a software update control system 1 according to a second example embodiment of the present invention will be described. A configuration of the software update control system 1 according to the present example embodiment is similar to that of the software update control system 1 according to the first example embodiment illustrated in FIG. 1. A software update control device 10 according to the present example embodiment has an operation flow configured differently from that in the first example embodiment. An operation (processing) of the software update control device 10 according to the present example embodiment will be described in detail with reference to flowcharts in FIGS. 6A and 6B.

Figure 5A:
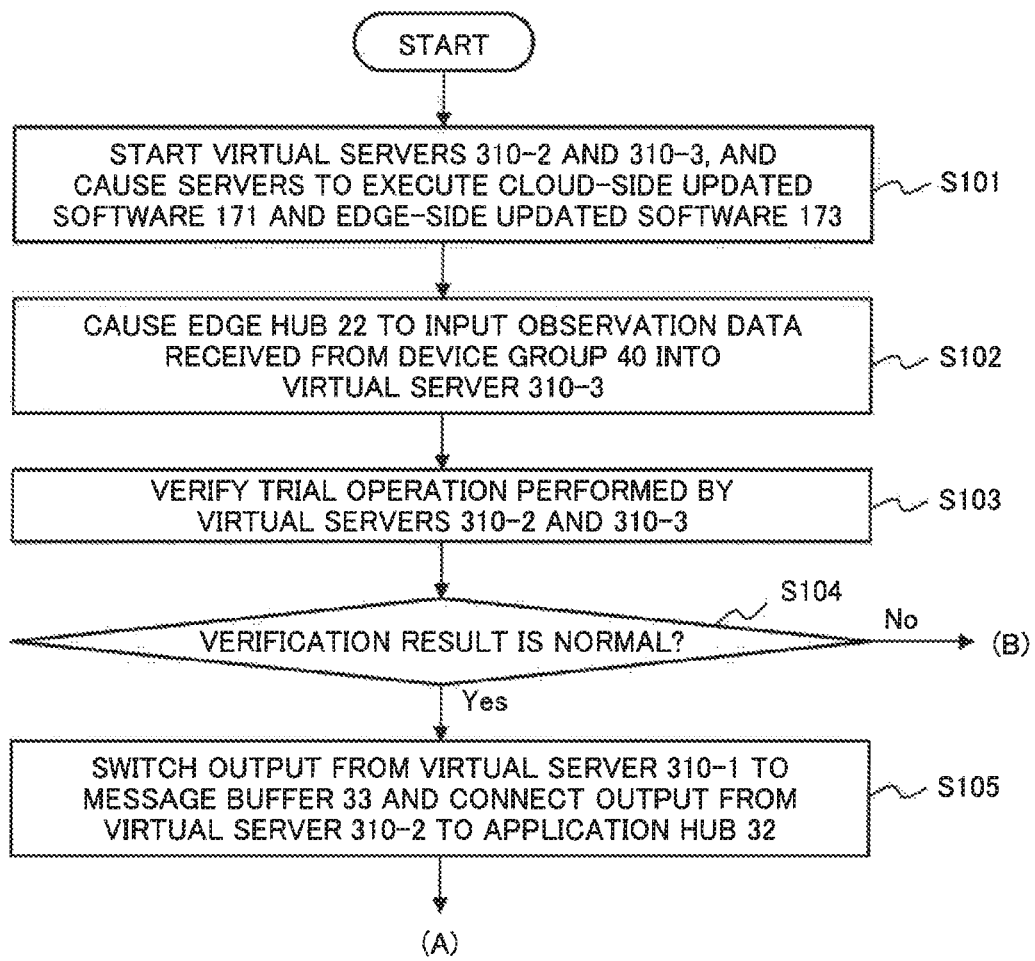
FIG. 5A is a flowchart (1/2) illustrating an operation of a software update control device 10 according to the first example embodiment of the present invention.

The software update control device 10 executes the processing in Steps S101 to S103 indicated in FIG. 5A (Step S201). When a verification result by a verification unit 12 is abnormal (No in Step S202), the software update control device 10 executes the processing in Steps S114 and S115 indicated in FIG. 5A (Step S211), and the entire processing ends.

When the verification result by the verification unit 12 is normal (Yes in Step S202), a transfer control unit 13 live migrates a virtual server 210 as a virtual server 310-4 (Step S203). A second virtual server control unit 14 live migrates a virtual server 310-3 as a new virtual server 210 (Step S204). The verification unit 12 verifies an operation performed by the virtual servers 210 and 310-2 (Step S205).

When the verification result by the verification unit 12 is abnormal (No in Step S206), the processing advances to Step S211. When the verification result by the verification unit 12 is normal (Yes in Step S206), a switching unit 15 switches an output by a virtual server 310-1 to a message buffer 33 and connects an output by the virtual server 310-2 to an application hub 32 (Step S207). The verification unit 12 verifies an operation performed by the virtual servers 210 and 310-2 (Step S208).

When the verification result by the verification unit 12 is abnormal (No in Step S209), the processing advances to Step S211. When the verification result by the verification unit 12 is normal (Yes in Step S209), the software update control device 10 executes the processing in Steps S112 and S113 indicated in FIG. 5B (Step S210), and the entire processing ends.

The software update control device 10 according to the present example embodiment is able to reliably perform update processing of software executed by an information processing device including only limited information processing resources, such as an edge server in an IoT system, without stopping the information processing device. The reason is as described in the first example embodiment.

Further, unlike the first example embodiment, the software update control device 10 according to the present example embodiment switches processing target information of a cloud-side system 30 from original output information to updated output information, after performing migration from the virtual server 210 to the virtual server 310-4 and migration from the virtual server 310-3 to the virtual server 210. Accordingly, the software update control device 10 according to the present example embodiment switches to updated software after verifying the updated software in a state closer to an actual operating environment and therefore is able to further improve availability of the system.

Third Example Embodiment

Next, a software update control system 1 according to a third example embodiment of the present invention will be described. A configuration of the software update control system 1 according to the present example embodiment is similar to the software update control system 1 according to the first example embodiment illustrated in FIG. 1. The software update control device 10 according to the present example embodiment performs control different from that by the first and second example embodiments on an edge-side system 20 and a cloud-side system 30.

Figure 7:
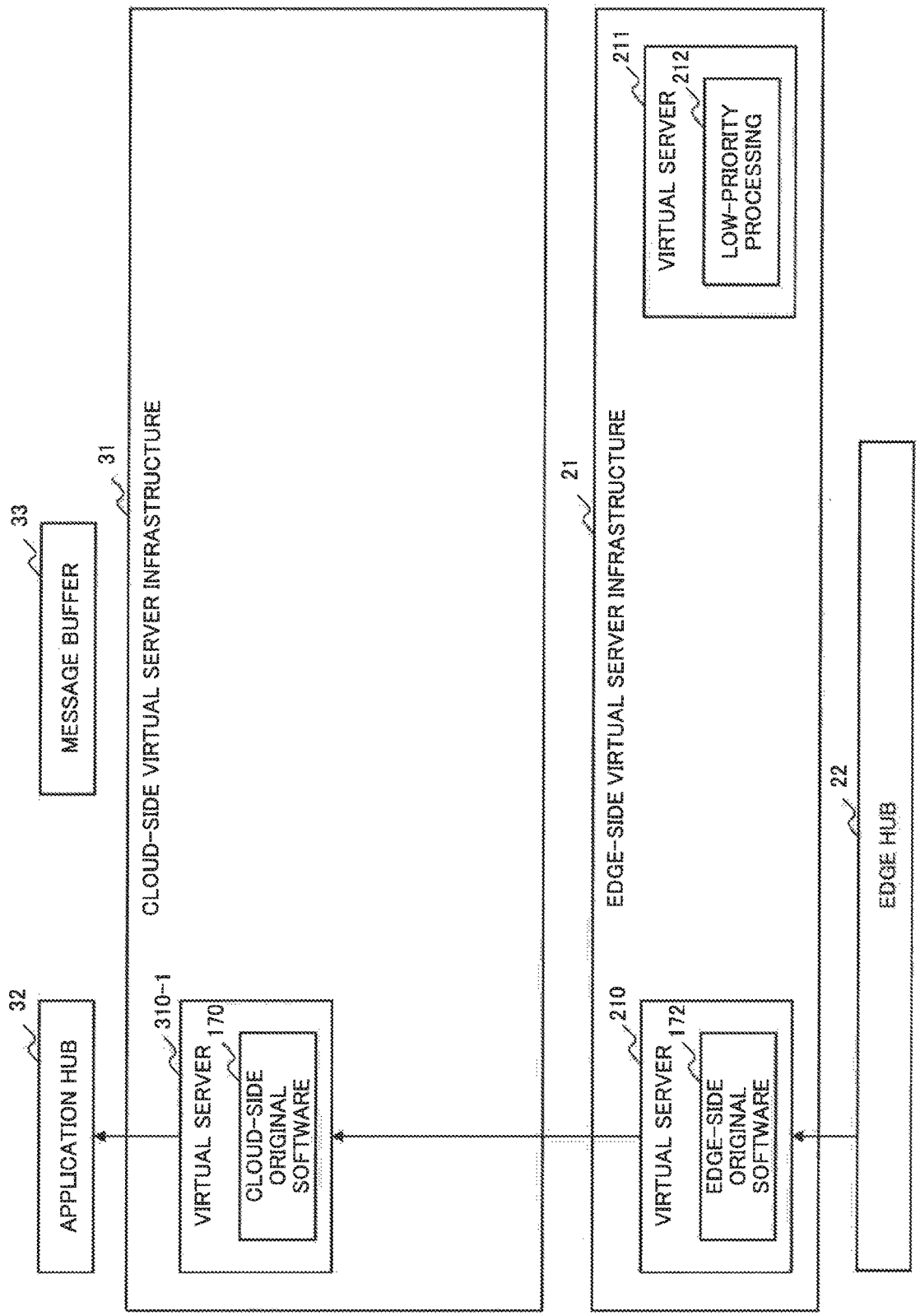
FIG. 7 is a diagram exemplifying a state of each system before update of software executed by an edge-side system 20 and a cloud-side system 30, according to a third example embodiment of the present invention.

FIG. 7 is a diagram exemplifying a state of each system before update of software executed by the edge-side system 20 and the cloud-side system 30, according to the present example embodiment. As exemplified in FIG. 7, unlike the case of the first example embodiment illustrated in FIG. 2, a virtual server 211 (fourth information processing resources) in addition to a virtual server 210 exists in an edge-side virtual server infrastructure 21 according to the present example embodiment. The virtual server 211 performs low-priority processing 212 with priority lower than a criterion.

In a state illustrated in FIG. 7, the software update control device 10 according to the present example embodiment starts processing of updating software executed by the edge-side system 20 and the cloud-side system 30 to edge-side updated software 173 and cloud-side updated software 171.

Figure 8:
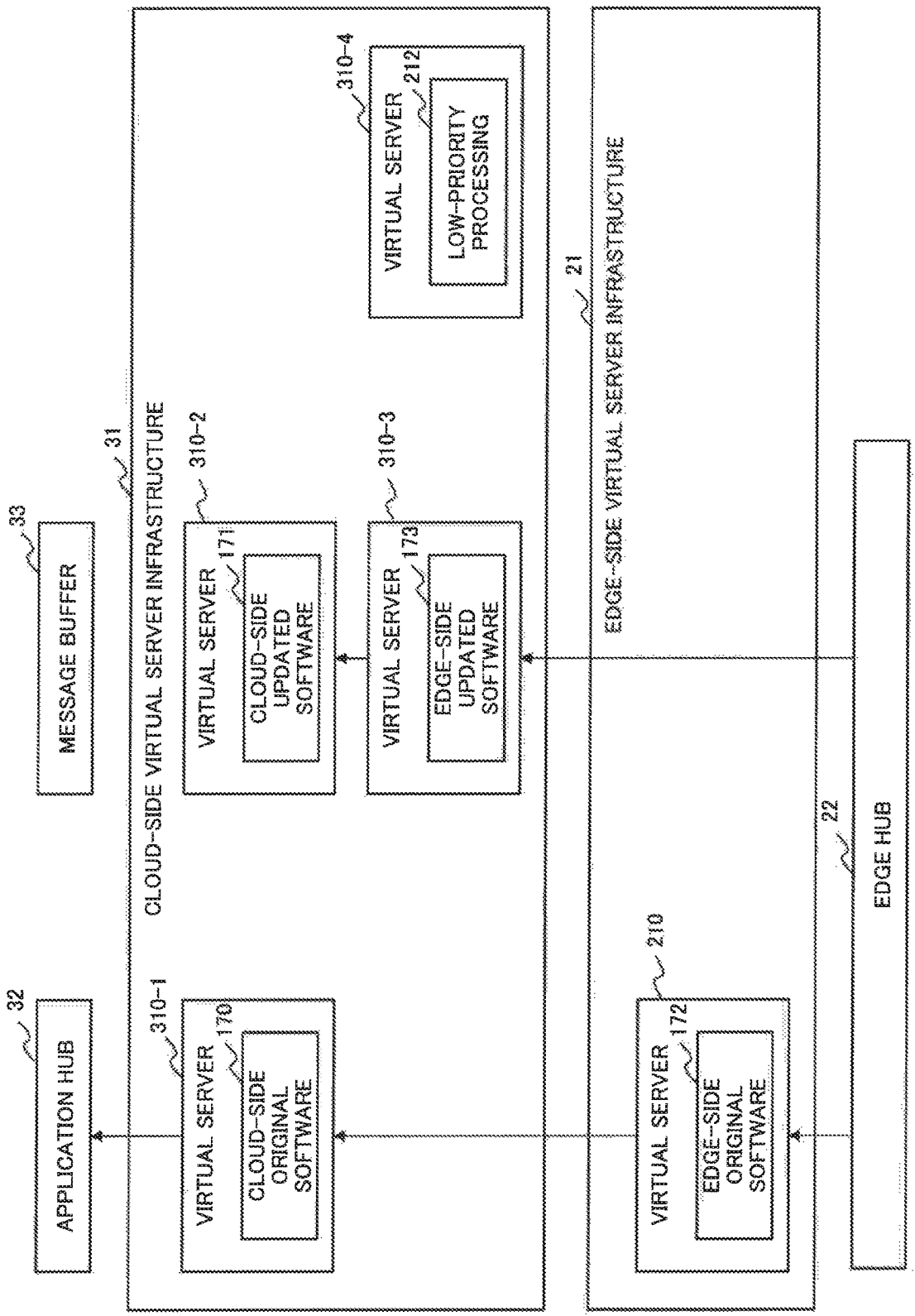
FIG. 8 is a diagram exemplifying a state of each system during the update of the software executed by the edge-side system 20 and the cloud-side system 30, according to the third example embodiment of the present invention.

FIG. 8 is a diagram exemplifying a state of each system during the update of the software executed by the edge-side system 20 and the cloud-side system 30, according to the present example embodiment. A transfer control unit 13 live migrates the virtual server 211 to a cloud-side virtual server infrastructure 31 as a virtual server 310-4 by controlling an edge-side virtual server infrastructure 21 and the cloud-side virtual server infrastructure 31, as illustrated in FIGS. 7 and 8.

FIG. 9 is a diagram exemplifying a state of each system after the update of the software executed by the edge-side system 20 and the cloud-side system 30, according to the present example embodiment. After the processing by the transfer control unit 13 is performed, the second virtual server control unit 14 live migrates a virtual server 310-3 to the edge-side virtual server infrastructure 21 as a new virtual server 211 by controlling the edge-side virtual server infrastructure 21 and the cloud-side virtual server infrastructure 31, as illustrated in FIGS. 8 and 9. Processing target data output by the virtual server 211 are input to a virtual server 310-2 by the live migration, and therefore an environment for processing observation data by updated software is maintained in the edge-side virtual server infrastructure 21 and the cloud-side virtual server infrastructure 31 even after the live migration is performed.

After the software update processing is completed, operation of the virtual servers 210 and 310-1 (i.e. an environment for executing the original software) illustrated in FIG. 9 is stopped by the first virtual server control unit 11 and the second virtual server control unit 14 at a timing when, for example, a verification result by a verification unit 12 is normal over a predetermined time period. After the operation of executing the edge-side original software 172 by the virtual server 210 is stopped, the transfer control unit 13 live migrates the virtual server 310-4 executing the low-priority processing 212 to the edge-side virtual server infrastructure 21 as a new virtual server 210. Consequently, the low-priority processing 212 returns to a state of being executed by the edge-side system 20, similarly to before the software update processing is performed.

Figure 10A:
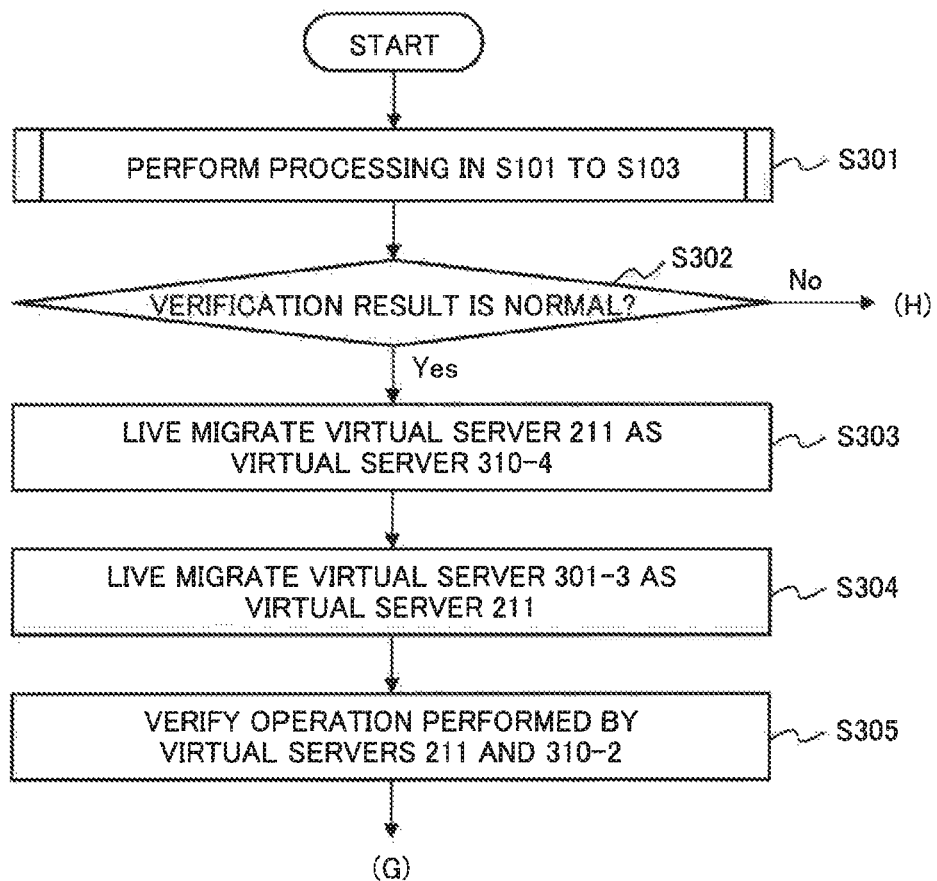
FIG. 10A is a flowchart (1/2) illustrating an operation of a software update control device 10 according to the third example embodiment of the present invention.
Figure 10B:
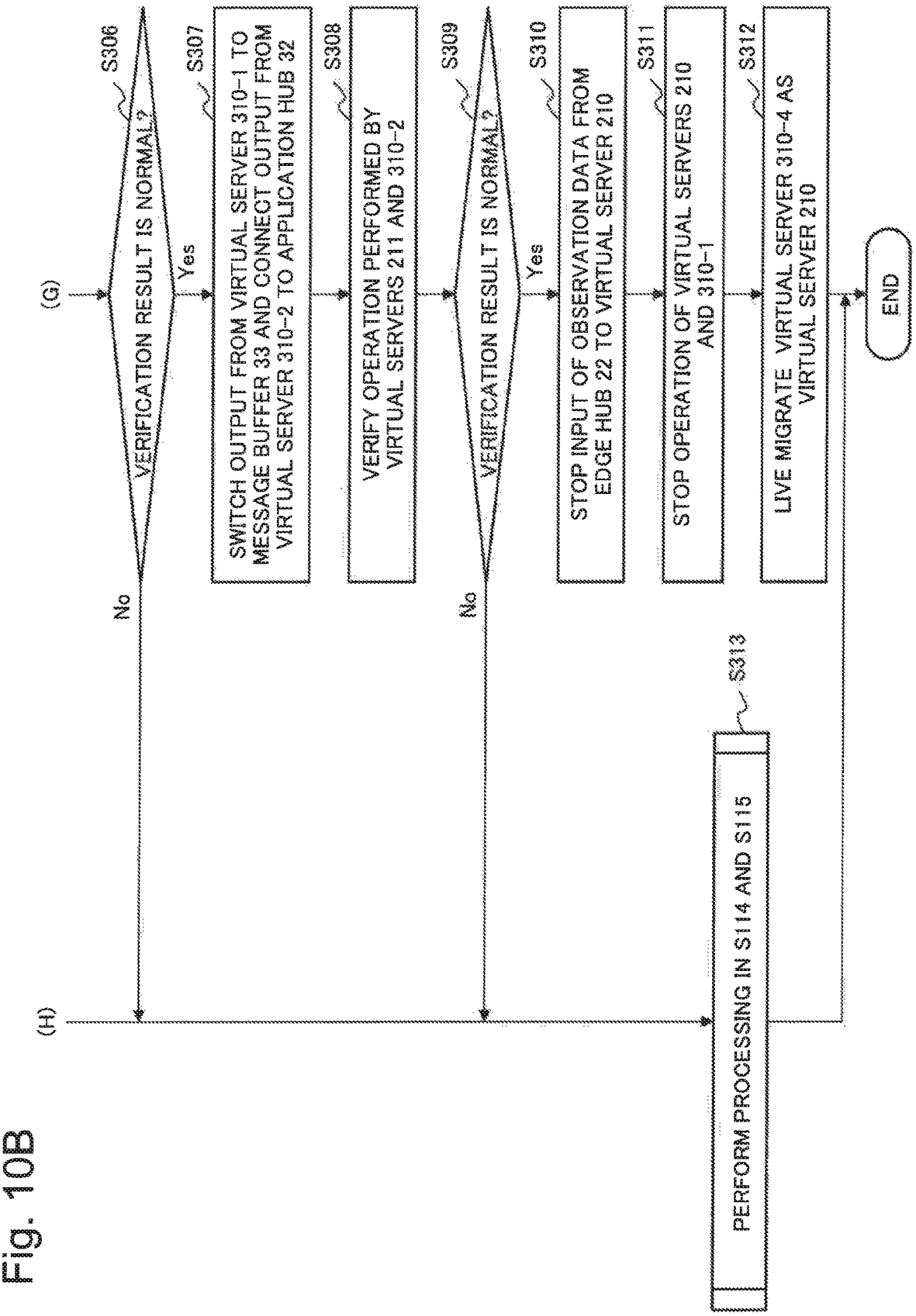
FIG. 10B is a flowchart (2/2) illustrating the operation of the software update control device 10 according to the third example embodiment of the present invention.

Next, an operation (processing) of the software update control device 10 according to the present example embodiment will be described in detail with reference to flowcharts in FIGS. 10A and 10B.

The software update control device 10 executes the processing in S101 to S103 indicated in FIG. 5A (Step S301). When a verification result by the verification unit 12 is abnormal (No in Step S302), the software update control device 10 executes the processing in Steps S114 and S115 indicated in FIG. 5A (Step S313), and the entire processing ends.

When the verification result by the verification unit 12 is normal, (Yes in Step S302), the transfer control unit 13 live migrates the virtual server 211 as the virtual server 310-4 (Step S303). The second virtual server control unit 14 live migrates the virtual server 310-3 as the virtual server 211 (Step S304). The verification unit 12 verifies an operation performed by the virtual servers 211 and 310-2 (Step S305).

When the verification result by the verification unit 12 is abnormal (No in Step S306), the processing advances to Step S313. When the verification result by the verification unit 12 is normal (Yes in Step S306), the switching unit 15 switches an output by the virtual server 310-1 to the message buffer 33 and connects an output by the virtual server 310-2 to the application hub 32 (Step S307). The verification unit 12 verifies an operation performed by the virtual servers 211 and 310-2 (Step S307).

When the verification result by the verification unit 12 is abnormal (No in Step S309), the processing advances to Step S313. When the verification result by the verification unit 12 is normal (Yes in Step S309), the edge hub control unit 16 stops input of observation data from the edge hub 22 to the virtual server 210 (Step S310). The transfer control unit 13 live migrates the virtual server 310-4 as the virtual server 210 (Step S312), and the entire processing ends.

The software update control device 10 according to the present example embodiment is able to reliably perform update processing of software executed by an information processing device including only limited information processing resources, such as an edge server in an IoT system, without stopping the information processing device. The reason is as described in the first example embodiment.

Further, the software update control device 10 according to the present example embodiment performs control in such a way as to perform software update processing without migrating the virtual server 210 executing the edge-side original software 172 to the cloud-side system 30. The processing is provided by reduction in a load on the edge-side system 20 as a result of temporarily migrating the virtual server 211 performing low-priority processing in the edge-side system 20 to the cloud-side system 30. Since the virtual server 211 performs low-priority processing, an influence of migrating the virtual server 211 to the cloud-side system 30 is small. By performing the aforementioned control, the software update control device 10 is able to reduce an influence of the software update processing on an environment for executing the original software.

Further, the software update control device 10 according to the present example embodiment performs control in such a way that the virtual server 210 executes the edge-side original software 172 in the edge-side system 20 rather than the cloud-side system 30 even after the software update processing is performed. Accordingly, when an anomaly occurs in processing by the updated software, the software update control device 10 is able to securely and promptly return the system to a state before the software update.

Fourth Example Embodiment

Figure 11:
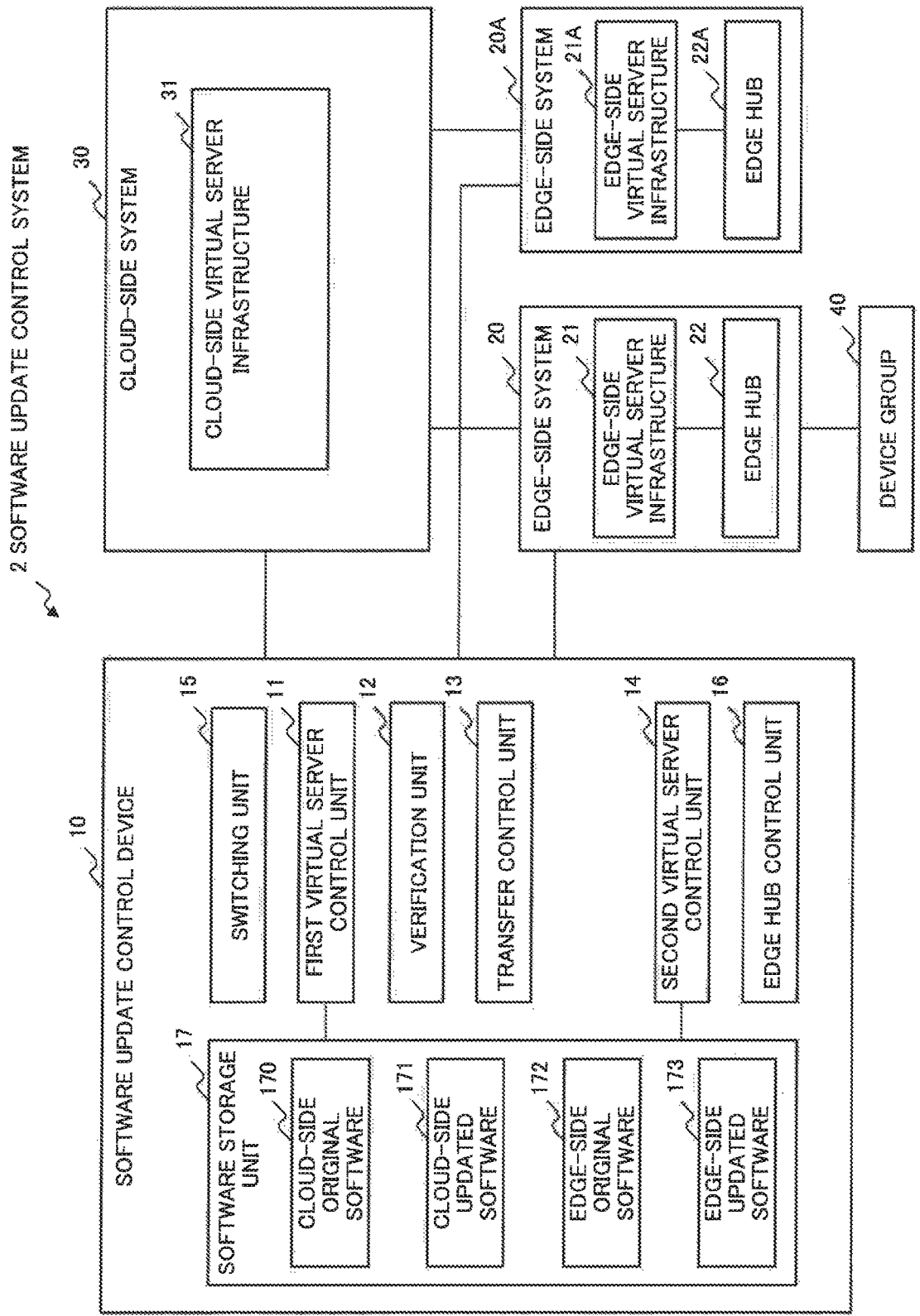
FIG. 11 is a block diagram illustrating a configuration of a software update control system 2 according to a fourth example embodiment of the present invention.

FIG. 11 is a block diagram conceptually illustrating a configuration of a software update control system 2 according to a fourth example embodiment of the present invention. The software update control system 2 has a configuration similar to that of the software update control system 1 according to the first example embodiment illustrated in FIG. 1 except for including an edge-side system 20A (third information processing system) in addition to an edge-side system 20. Similarly to the edge-side system 20, the edge-side system 20A according to the present example embodiment includes an edge-side virtual server infrastructure 21A and an edge hub 22A. A function of the edge-side system 20A is similar to that of the edge-side system 20.

Similarly to the first example embodiment, a state of the edge-side system 20 and a cloud-side system 30, according to the present example embodiment, before update of software executed by the systems is as illustrated in FIG. 2.

In the state illustrated in FIG. 2, a software update control device 10 according to the present example embodiment starts processing of updating the software executed by the edge-side system 20 and the cloud-side system 30 to edge-side updated software 173 and cloud-side updated software 171.

Figure 12:
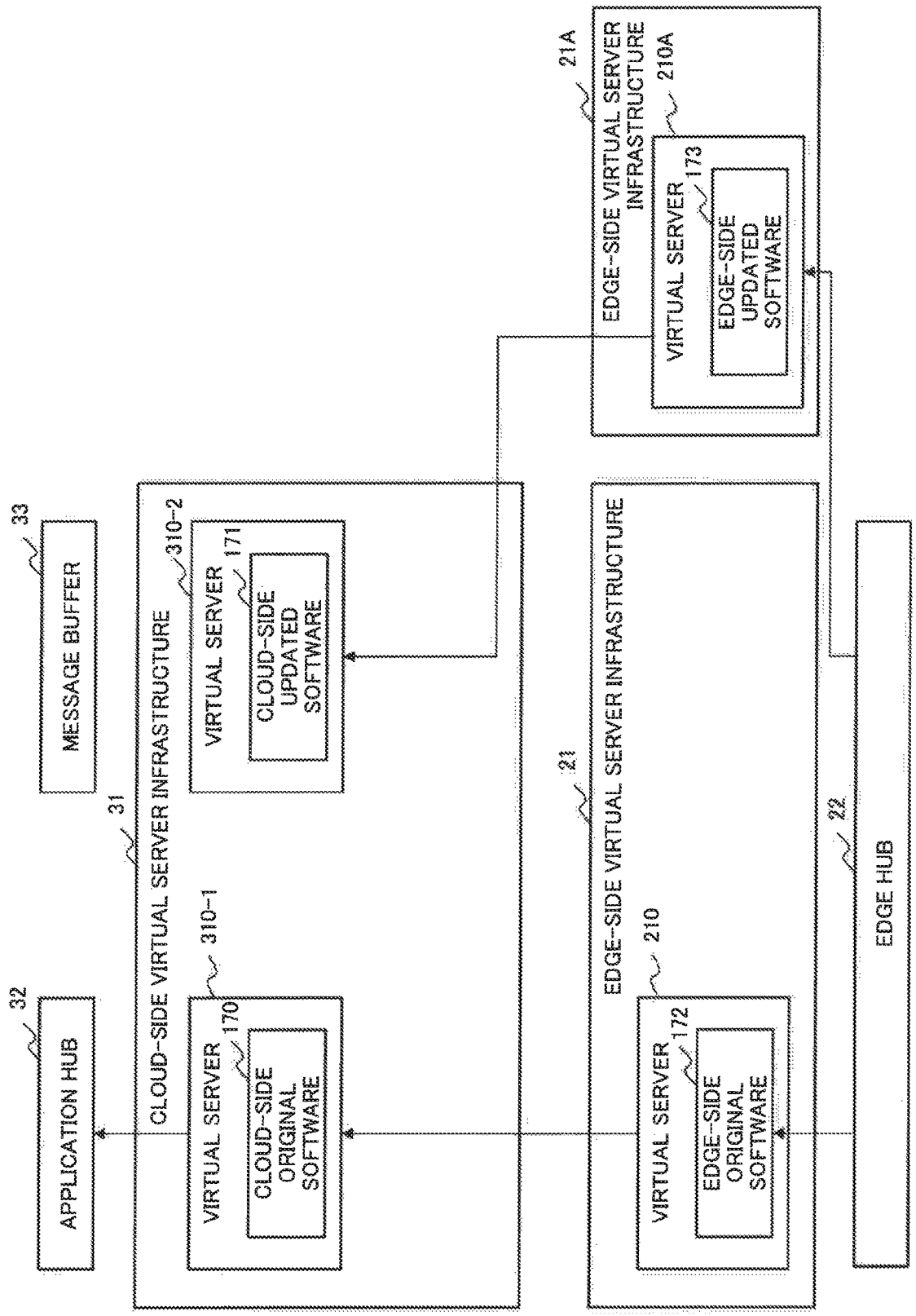
FIG. 12 is a diagram exemplifying a state of each system during update of software executed by an edge-side system 20 and a cloud-side system 30, according to the fourth example embodiment of the present invention.

FIG. 12 is a diagram exemplifying a state of each system during the update of the software executed by the edge-side system 20 and the cloud-side system 30, according to the present example embodiment.

A first virtual server control unit 11 illustrated in FIG. 11 newly boots up a virtual server 210A (fifth information processing resources) by controlling the edge-side virtual server infrastructure 21A, as illustrated in FIG. 12. The first virtual server control unit 11 reads the edge-side updated software 173 from a software storage unit 17 and performs control in such a way that the virtual server 210A executes the read edge-side updated software 173. The first virtual server control unit 11 boots up a virtual server 310-2 by controlling a cloud-side virtual server infrastructure 31 and performs control in such a way that the virtual server 310-2 executes the cloud-side updated software 171, similarly to the first example embodiment.

In other words, the first virtual server control unit 11 according to the present example embodiment boots up the virtual server 210A in the edge-side system 20A instead of booting up a virtual server 310-3 in the cloud-side system 30 as is performed in the first example embodiment. The software update control device 10 according to the present example embodiment performs on the virtual server 210A processing similar to the processing performed on the virtual server 310-3 in the first example embodiment. A state of the edge-side system 20 and the cloud-side system 30, according to the present example embodiment, after the software executed by the systems is updated through control by the software update control device 10 is as illustrated in FIG. 4, similarly to the first example embodiment.

Figure 13A:
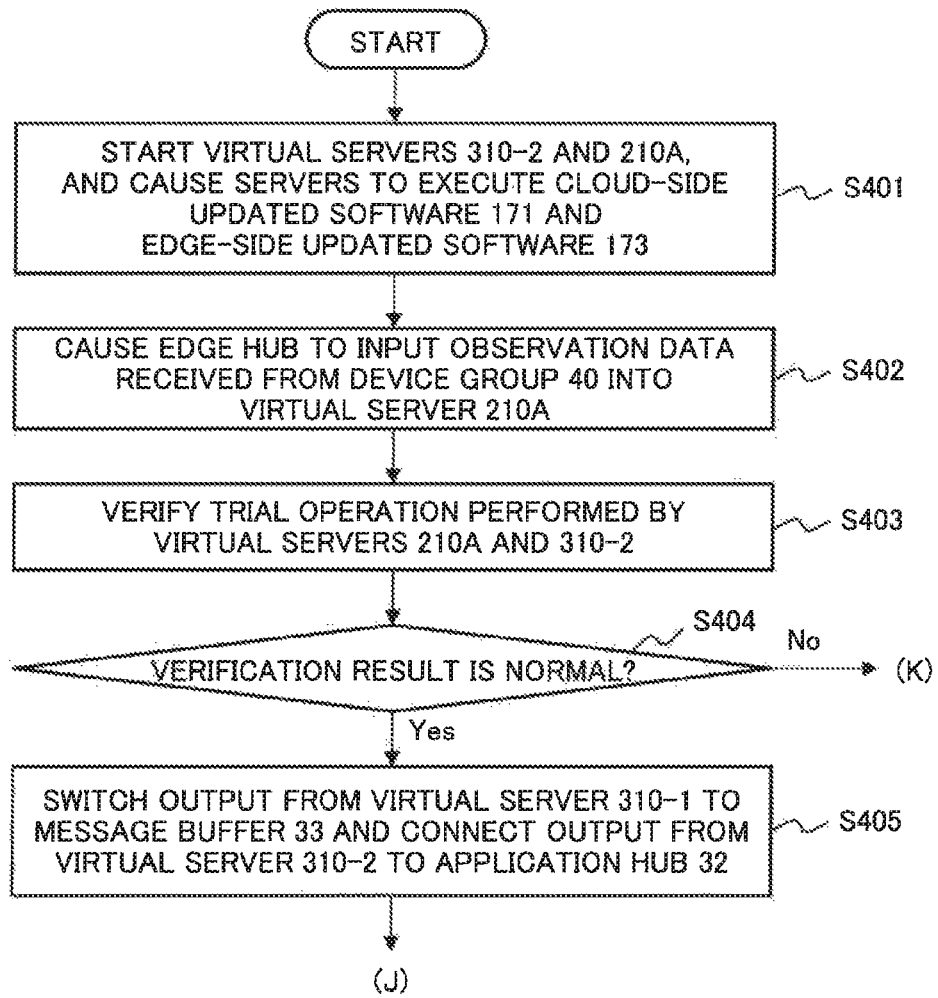
FIG. 13A is a flowchart (1/2) illustrating an operation of a software update control device 10 according to the fourth example embodiment of the present invention.
Figure 13B:
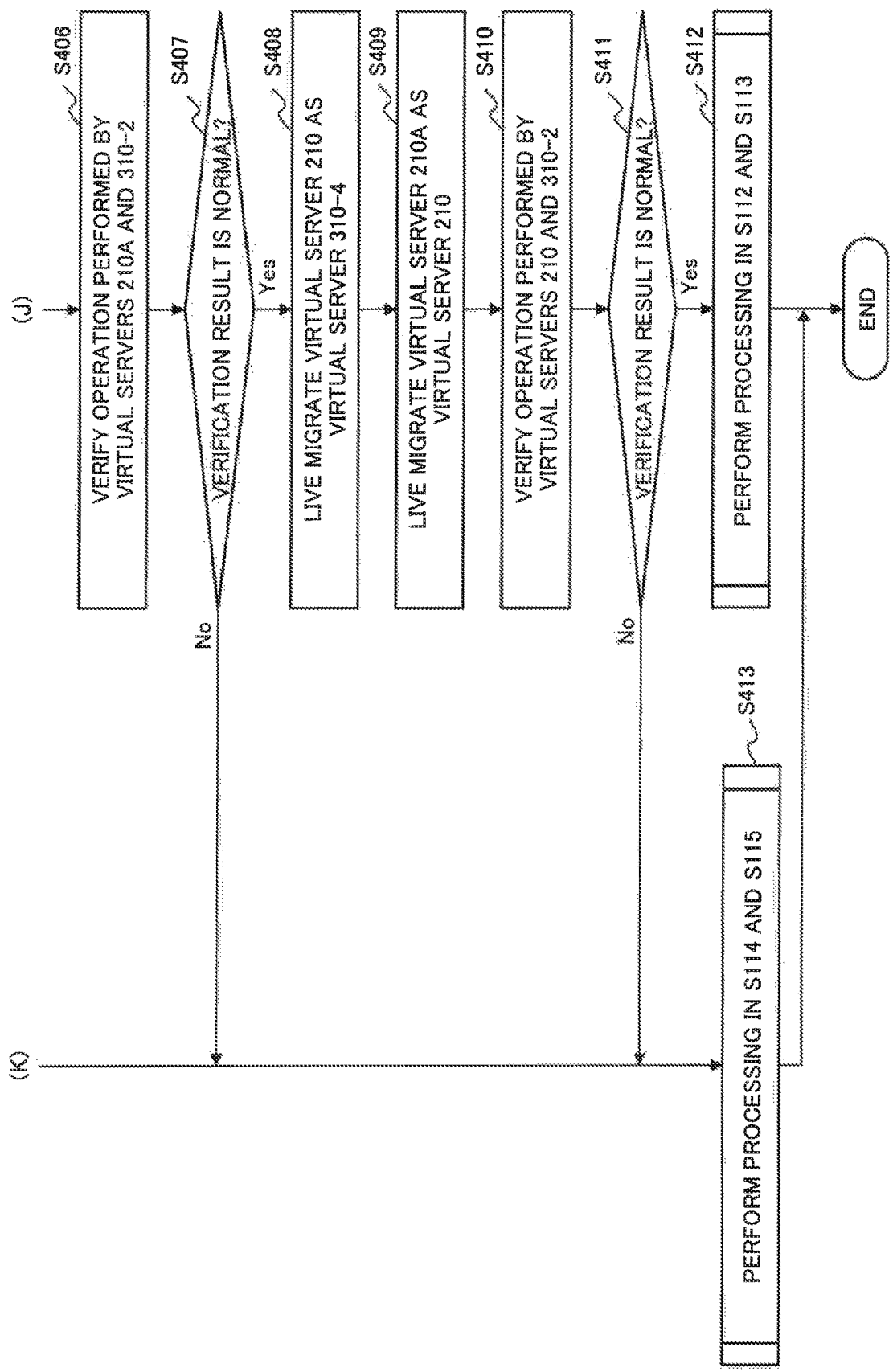
FIG. 13B is a flowchart (2/2) illustrating the operation of the software update control device 10 according to the fourth example embodiment of the present invention.

Next, an operation (processing) of the software update control device 10 according to the present example embodiment will be described in detail with reference to flowcharts in FIGS. 13A and 13B.

The first virtual server control unit 11 starts the virtual servers 310-2 and 210A, and causes the servers to execute the cloud-side updated software 171 and the edge-side updated software 173, respectively (Step S401). An edge hub control unit 16 causes an edge hub 22 to input observation data received from a device group 40 to the virtual server 210A (Step S402). A verification unit 12 verifies a trial operation performed by the virtual servers 210A and 310-2 (Step S403).

When the verification result by the verification unit 12 is abnormal (No in Step S404), the software update control device 10 executes the processing in Steps S114 and S115 indicated in FIG. 5A (Step S413), and the entire processing ends.

When the verification result by the verification unit 12 is normal (Yes in Step S404), a switching unit 15 switches an output by a virtual server 310-1 to a message buffer 33 and connects an output by the virtual server 310-2 to an application hub 32 (Step S405). The verification unit 12 verifies an operation performed by the virtual servers 210A and 310-2 (Step S406).

When the verification result by the verification unit 12 is abnormal (No in Step S407), the processing advances to Step S413. When the verification result by the verification unit 12 is normal (Yes in Step S407), the transfer control unit 13 live migrates a virtual server 210 as a virtual server 310-4 (Step S408). A second virtual server control unit 14 live migrates the virtual server 210A as the virtual server 210 (Step S409). The verification unit 12 verifies an operation performed by the virtual servers 210 and 310-2 (Step S410).

When the verification result by the verification unit 12 is abnormal (No in Step S411), the processing advances to Step S413. When the verification result by the verification unit 12 is normal (Yes in Step S411), the software update control device 10 executes the processing in Steps S112 and S113 indicated in FIG. 5B (Step S412), and the entire processing ends.

The software update control device 10 according to the present example embodiment is able to reliably perform update processing of software executed by an information processing device including only limited information processing resources, such as an edge server in an IoT system, without stopping the information processing device. The reason is as described in the first example embodiment.

Further, the software update control device 10 according to the present example embodiment constructs a virtual server performing a trial operation by use of the edge-side updated software 173 not in the cloud-side system 30 but in another system being the edge-side system 20A. Consequently, the software update control device 10 is able to perform software update processing while avoiding cost increase, a performance problem, or the like accompanying construction of a virtual server performing the trial operation in the cloud-side system 30.

Fifth Example Embodiment

Figure 14:
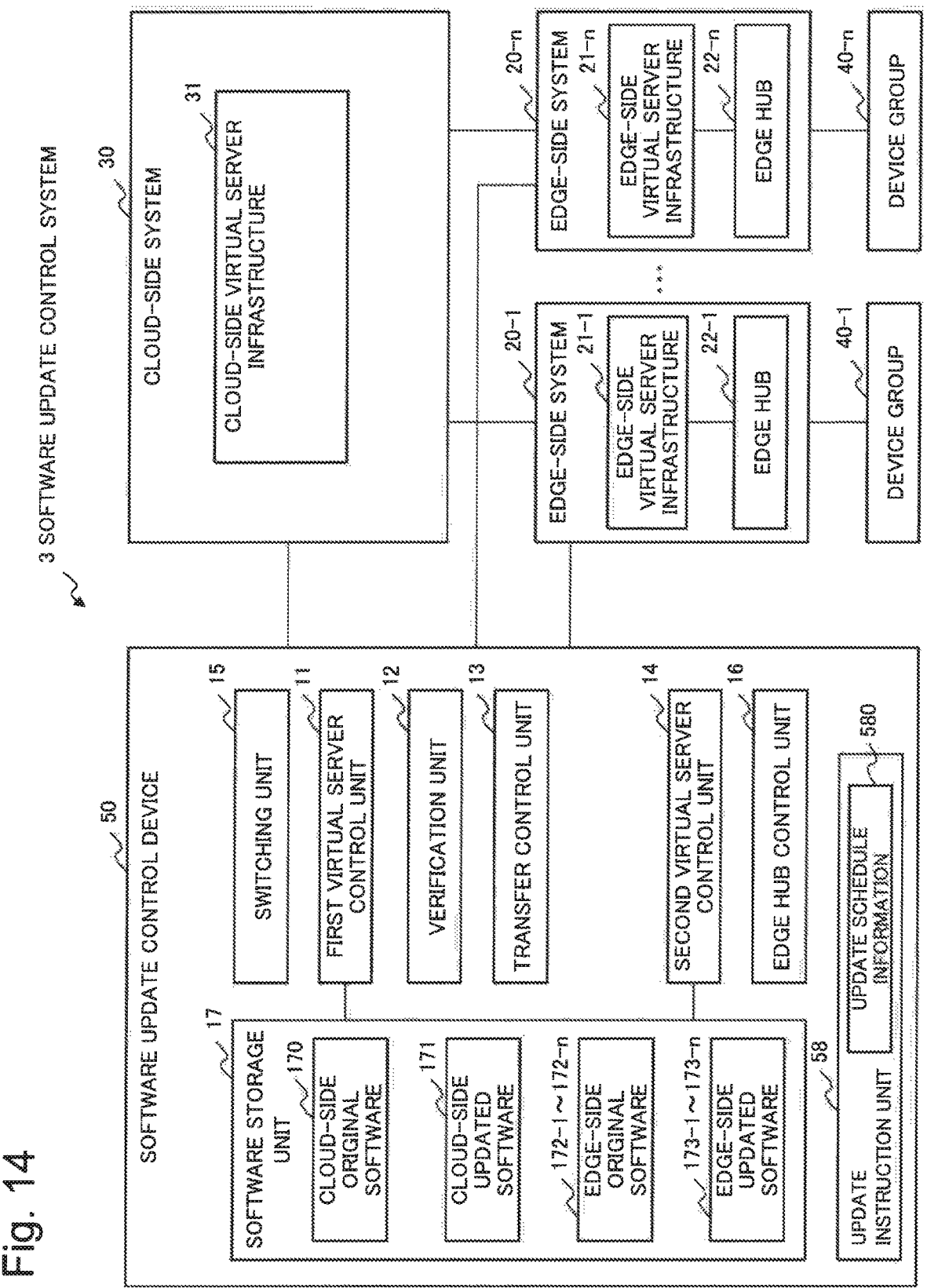
FIG. 14 is a block diagram illustrating a configuration of a software update control system 3 according to a fifth example embodiment of the present invention.

FIG. 14 is a block diagram conceptually illustrating a configuration of a software update control system 3 according to a fifth example embodiment of the present invention. Roughly classifying, the software update control system 3 includes a software update control device 50, n (where n is any natural number greater than or equal to 2) pieces of edge-side systems 20-1 to 20-n, a cloud-side system 30, and device groups 40-1 to 40-n.

A configuration of each of the edge-side systems 20-1 to 20-n is similar to that of the edge-side system 20 according to the first example embodiment illustrated in FIG. 1. Specifically, the edge-side systems 20-1 to 20-n include edge-side virtual server infrastructures 21-1 to 21-n and edge hubs 22-1 to 22-n. The edge-side systems 20-1 to 20-n are communicably connected to the device groups 40-1 to 40-n and receive observation data output by the device groups 40-1 to 40-n. The edge-side systems 20-1 to 20-n perform processing similar to that by the edge-side system 20 according to the first example embodiment on the received observation data.

The cloud-side system 30 according to the present example embodiment is communicably connected to the edge-side systems 20-1 to 20-n and performs processing similar to that according to the first example embodiment on processing target data output by the edge-side systems 20-1 to 20-n.

A software update control device 50 is a device controlling update processing on software executed by virtual servers in the edge-side systems 20-1 to 20-n and the cloud-side system 30, similarly to the software update control device 10 according to the first example embodiment.

As illustrated in FIG. 14, the software update control device 50 includes an update instruction unit 58 in addition to the configuration of the software update control device 10 according to the first example embodiment. The update instruction unit 58 stores update schedule information 580 in an internal electronic memory or the like. The update schedule information 580 is information indicating a software update schedule (e.g. an execution date and time) for each of the edge-side systems 20-1 to 20-n.

The update instruction unit 58 detects arrival of a date and time for software update with respect to a specific edge-side system out of the edge-side systems 20-1 to 20-n, in accordance with the update schedule information 580. Alternatively, the update instruction unit 58 accepts information instructing software update with respect to a specific edge system, the information being input by a system administrator or the like.

At this time, the update instruction unit 58 outputs instruction information instructing to perform software update processing on the specific edge-side system. Triggered by the output of the instruction information, the software update control device 50 starts software update processing. When performing software update processing on a plurality of edge-side systems, the update instruction unit 58 may issue an instruction to start a plurality of update processing operations at a same timing. Alternatively, the update instruction unit 58 may issue an instruction to successively start update processing on the basis of information indicating a state of a free area in a memory related to the cloud-side system 30, a communication network bandwidth, or the like.

As illustrated in FIG. 14, a software storage unit 17 according to the present example embodiment stores edge-side original software 172-1 to 172-$n$ and edge-side updated software 173-1 to 173-$n$ with respect to the edge-side systems 20-1 to 20-$n$.

Figure 15:
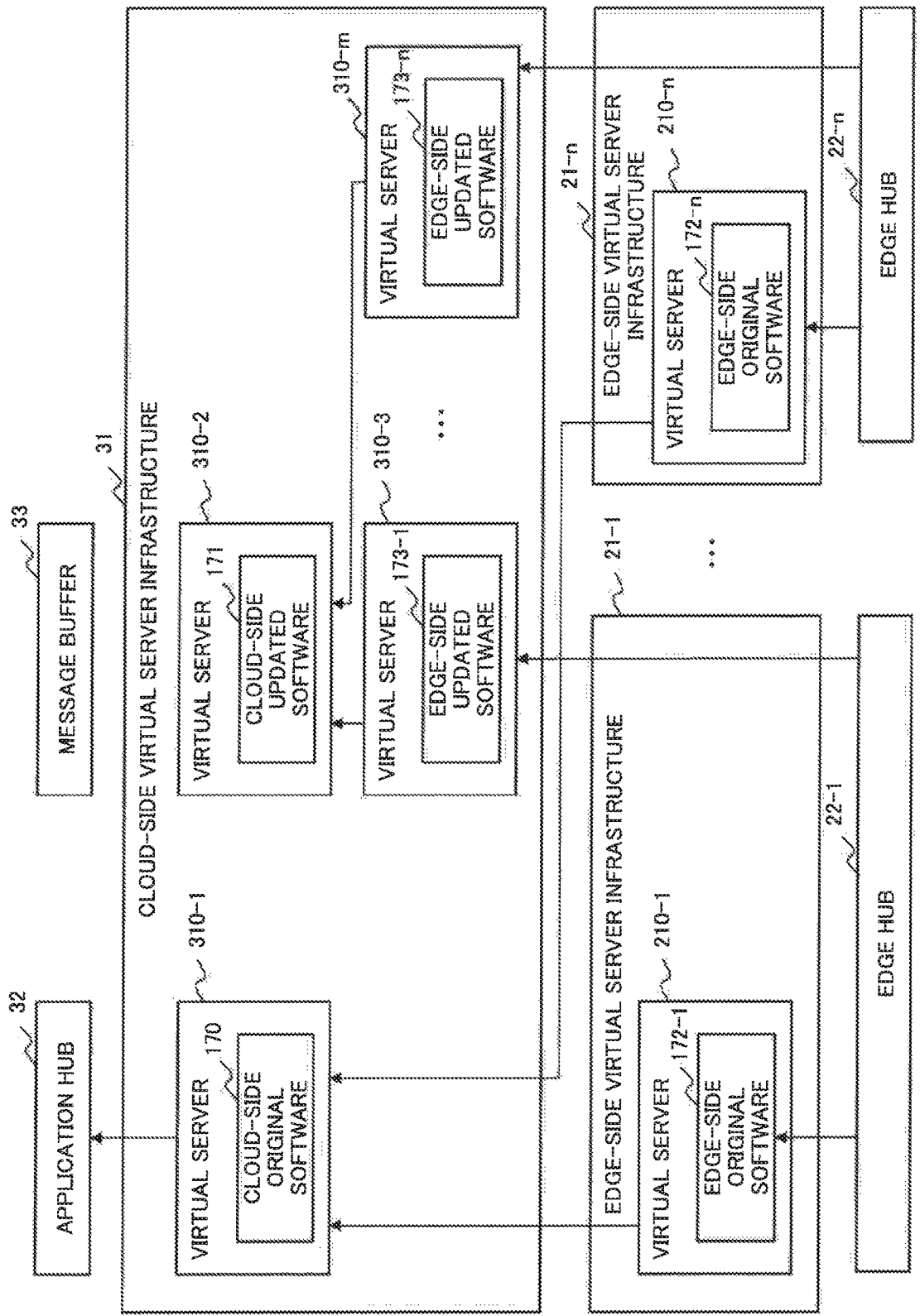
FIG. 15 is a diagram exemplifying a state of each system during update of software executed by edge-side systems 20-1 to 20-n and a cloud-side system 30, according to the fifth example embodiment of the present invention.

FIG. 15 is a diagram exemplifying a state of each system during update of software executed by the edge-side systems 20-1 to 20-$n$ and the cloud-side system 30, according to the present example embodiment. As illustrated in FIG. 15, in a process of updating the software, the software update control device 50 performs control in such a way that the cloud-side system 30 executes a plurality of virtual servers 310-3 to 310-$m$ (where m is any integer greater than or equal to 3) performing a trial operation by use of the edge-side updated software. By a procedure similar to that by the software update control device 10 according to the first example embodiment, the software update control device 50 controls the software update processing executed by the plurality of edge-side systems 20-1 to 20-$n$.

The software update control device 50 according to the present example embodiment is able to reliably perform update processing of software executed by an information processing device including only limited information processing resources, such as an edge server in an IoT system, without stopping the information processing device. The reason is as described in the first example embodiment.

Further, the software update control device 50 according to the present example embodiment is able to perform the aforementioned processing even when updating software with respect to a plurality of edge-side systems.

Sixth Example Embodiment

FIG. 16 is a block diagram conceptually illustrating a configuration of a software update control device 60 according to a sixth example embodiment of the present invention.

The software update control device 60 according to the present example embodiment includes a first execution control unit 61, a verification unit 62, a transfer control unit 63, a second execution control unit 64, and a switching unit 65.

A second information processing system 80 illustrated in FIG. 16 processes original output information output by first information processing resources 71 included in a first information processing system 70 executing original software 710. In this case, the first execution control unit 61 performs control in such a way that second information processing resources 81 included in the second information processing system 80 executes updated software 711.

The verification unit 62 verifies a trial operation in which the second information processing system 80 processes information output by the second information processing resources 81 executing the updated software 711.

When a verification result with respect to the trial operation by the verification unit 62 is normal, the transfer control unit 63 performs control in such a way that a state of outputting original output information is transferred from the first information processing resources 71 to third information processing resources 82 included in the second information processing system 80. Then, the transfer control unit 63 performs control in such a way that the second information processing system 80 is able to process original output information output by the third information processing resources 82.

After the processing by the transfer control unit 63 is performed, the second execution control unit 64 performs control in such a way that the first information processing resources 71 outputs updated output information by executing the updated software 711.

The switching unit 65 switches processing target information being a processing target of the second information processing system 80, from original output information output by the first information processing resources 71 or the third information processing resources 82 to updated output information output by the first information processing resources 71 or the second information processing resources 81.

The software update control device 60 according to the present example embodiment is able to reliably perform update processing of software executed by an information processing device including only limited information processing resources, such as an edge server in an IoT system, without stopping the information processing device. The reason is that the software update control device 60 constructs an entire operating environment after software update in the second information processing system 80, verifies an operation thereof, and then performs control in such a way that an operating environment before the software update in the first information processing system 70 is moved to the second information processing system 80 and also the first information processing system 70 executes the updated software.

Hardware Configuration Example

Each unit in the software update control devices illustrated in FIGS. 1, 11, 14, and 16, according to the respective aforementioned example embodiments, may be provided by dedicated hardware (HW) (an electronic circuit). Further, at least the following configurations in FIGS. 1, 11, 14, and 16 may be viewed as function (processing) units of a software program (software modules):

the first virtual server control unit 11,
the verification units 12 and 62,
the transfer control units 13 and 63,
the second virtual server control unit 14,
the switching units 15 and 65,
the edge hub control unit 16,
the storage control function in the software storage unit 17,
the update instruction unit 58,
the first execution control unit 61, and
the second execution control unit 64.

However, allocation of the respective units illustrated in the drawings is a configuration for convenience of description, and various configurations may be assumed when implementation takes place. An example of a hardware environment in this case will be described with reference to FIG. 17.

FIG. 17 is a diagram exemplarily illustrating a configuration of an information processing device 900 (computer) capable of providing the software update control devices according to the respective example embodiments of the present invention. In other words, FIG. 17 illustrates a hardware environment being a configuration of a computer (information processing device) capable of providing the software update control devices illustrated in FIGS. 1, 11, 14, and 16, the environment being capable of providing the respective functions according to the aforementioned example embodiments.

The information processing device 900 illustrated in FIG. 17 includes the following as components:
- a central processing unit (CPU) 901,
- a read only memory (ROM) 902,
- a random access memory (RAM) 903,
- a hard disk (storage device) 904,
- a communication interface 905 with an external device,
- a bus 906 (communication line),
- a reader-writer 908 capable of read and write data stored in a recording medium 907 such as a compact disc read only memory (CD-ROM), and
- an input-output interface 909.

Specifically, the information processing device 900 including the aforementioned components is a general computer in which the configurations are connected through the bus 906. The information processing device 900 may include a plurality of CPUs 901 or may include a CPU 901 having a multi-core configuration.

Then, the present invention described with the aforementioned example embodiments as examples supplies to the information processing device 900 illustrated in FIG. 17 a computer program capable of providing the following functions. The functions refer to the functions of the aforementioned configurations in the block diagrams (FIGS. 1, 11, 14, and 16) or the flowcharts (FIGS. 5A and 5B, FIGS. 6A and 6B, FIGS. 10A and 10B, and FIGS. 13A and 13B) referred to in the description of the respective example embodiments. The present invention is achieved by the computer program subsequently being read, interpreted, and executed by the CPU 901 in the hardware. Further, the computer program supplied into the device may be stored in a readable-writable transitory memory (RAM 903) or a non-transitory storage device such as the ROM 902 or the hard disk 904.

Further, in the case described above, a supply method of the computer program into the hardware may employ a currently common procedure. For example, the procedure includes a method of installation into the device through various types of recording media 907 such as a CD-ROM, and a method of external download through a communication line such as the Internet. Then, in such a case, the present invention may be viewed to be configured by a code constituting such a computer program or a recording medium 907 storing the code.

The invention of the present application has been described so far with the above example embodiments by way of model example. However, the invention of the present application is not limited to the example embodiments described above. In other words, various aspects that can be understood by a person skilled in the art are applicable to the invention of the present application within the scope of the invention of the present application.

This application is based upon and claims the benefit of priority from Japanese patent application No. 2016-081773, filed on Apr. 15, 2016, the disclosure of which is incorporated herein in its entirety by reference.

REFERENCE SIGNS LIST

1 Software update control system
2 Software update control system
3 Software update control system
10 Software update control device
11 First virtual server control unit
12 Verification unit
13 Transfer control unit
14 Second virtual server control unit
15 Switching unit
16 Edge hub control unit
17 Software storage unit
170 Cloud-side original software
171 Cloud-side updated software
172 Edge-side original software
172-1 to 172-$n$ Edge-side original software
173 Edge-side updated software
173-1 to 173-$n$ Edge-side updated software
20 Edge-side system
20A Edge-side system
20-1 to 20-$n$ Edge-side system
21 Edge-side virtual server infrastructure
21A Edge-side virtual server infrastructure
21-1 to 21-$n$ Edge-side virtual server infrastructure
210 Virtual server
211 Virtual server
212 Low-priority processing
22 Edge hub
22A Edge hub
22-1 to 22-$n$ Edge hub
30 Cloud-side system
31 Cloud-side virtual server infrastructure
310-1 to 310-$m$ Virtual server
32 Application hub
33 Message buffer
34 Application
40 Device group
40-1 to 40-$n$ Device group
50 Software update control device
58 Update instruction unit
580 Update schedule information
60 Software update control device
61 First execution control unit
62 Verification unit
63 Transfer control unit
64 Second execution control unit
65 Switching unit
70 First information processing system
71 First information processing resources
710 Original software
711 Updated software
80 Second information processing system
81 Second information processing resources
82 Third information processing resources
900 Information processing device
901 CPU
902 ROM
903 RAM
904 Hard disk (storage device)
905 Communication interface
906 Bus
907 Recording medium
908 Reader-writer
909 Input-output interface

What is claimed is:

1. A software update control device comprising: at least one memory configured to store computer program code: at least one processor configured to operate according to the computer program code, the computer program code including:
a first execution control unit code configured to cause at least one of the at least one processor to perform control in such a way that, when a second information processing system processes original output information output by first information processing resources included in a first information processing system executing software before update, second information processing resources included in the second information processing system execute the software being updated;

a verification code configured to cause at least one of the at least one processor to verify a trial operation in which the second information processing system processes information output by the second information processing resources executing the updated software;

a transfer control code configured to cause at least one of the at least one processor to perform control in such a way that, when a verification result by the verification code with respect to the trial operation indicates being normal, a state of outputting the original output information is transferred from the first information processing resources to third information processing resources included in the second information processing system, and the second information processing system is able to process the original output information output by the third information processing resources;

a second execution control code configured to cause at least one of the at least one processor to perform control in such a way that, after processing by the transfer control code is performed, the first information processing resources output updated output information by executing the updated software; and a switching code configured to cause at least one of the at least one processor to switch processing target information being a processing target of the second information processing system, from the original output information output by the first or third information processing resources, to the updated output information output by the first or second information processing resources.

2. The software update control device according to claim 1, further comprising
a data reception unit control code configured to cause at least one of the at least one processor to perform control in such a way that, in a case that the first information processing resources process processing target data received from outside by a data reception unit included in the first information processing system, when the second information processing resources execute the updated software by the first execution control code, the data reception code is configured to cause at least one of the at least one processor to copy the processing target data and inputs the copied processing target data to the second information processing resources.

3. The software update control device according to claim 1, wherein
the switching code configured to cause at least one of the at least one processor to perform control in such a way that, after the processing target information is switched, the second information processing system processes the original output information output by the third information processing resources, and store a result of the processing in a storage unit included in the second information processing system.

4. The software update control device according to claim 3, wherein
the verification code is configured to cause at least one of the at least one processor to verify an updated operation in which the second information processing system processes the updated output information output by the first information processing resources, and, when a verification result by the verification code with respect to the updated operation indicates being abnormal, the switching code is configured to cause at least one of the at least one processor to perform control in such a way as to switch the processing target information from information acquired by the updated operation, to information stored in the storage unit.

5. The software update control device according to claim 1, wherein,
when fourth information processing resources included in the first information processing system perform processing with priority lower than a criterion, the transfer control coded is configured to cause at least one of the at least one processor to perform control in such a way that processing performed by the fourth information processing resources is transferred to the third information processing resources, after processing by the transfer control code is performed, the second execution control code is configured to cause at least one of the at least one processor to perform control in such a way that the fourth information processing resources output the updated output information by executing the updated software, and the switching code is configured to cause at least one of the at least one processor to switch the processing target information from the original output information output by the first information processing resources, to the updated output information output by the fourth information processing resources.

6. The software update control device according to claim 1, wherein
the first execution control code is configured to cause at least one of the at least one processor to perform control in such a way that fifth information processing resources included in a third information processing system execute the updated software, the verification code is configured to cause at least one of the at least one processor to verify the trial operation in which the second information processing system processes the updated output information output by the fifth information processing resources, and the switching code is configured to cause at least one of the at least one processor to switch the processing target information, from the original output information output by the first or third information processing resources, to the updated output information output by the first or fifth information processing resources.

7. The software update control device according to claim 1, further comprising
update instruction code is configure to cause at least one of the at least one processor to output, for each of a plurality of the first information processing systems, instruction information instructing update of the software in a specific first information processing system of the first information processing systems, based on information indicating a schedule for update processing of the software or information input from outside, wherein
the first execution control code, the verification code, the transfer control code, the second execution control code, and the switching code is configured to cause at least one of the at least one processor to execute processing related to the specific first information processing system, based on the instruction information.

8. The software update control device according to claim 1 further comprising
the first and second information processing systems.

9. A software update control method comprising, by an information processing device:
performing control in such a way that, when a second information processing system processes original output information output by first information processing resources included in a first information processing system executing software before update, second information processing resources included in the second information processing system execute the software being updated;
verifying a trial operation in which the second information processing system processes information output by the second information processing resources executing the updated software;
performing control in such a way that, when a verification result with respect to the trial operation indicates being normal, a state of outputting the original output information is transferred from the first information processing resources to third information processing resources included in the second information processing system, and the second information processing system is able to process the original output information output by the third information processing resources;
performing control in such a way that, after entering a state in which the second information processing system is able to process the original output information output from the third information processing resources, the first information processing resources output updated output information by executing the updated software; and
switching processing target information being a processing target of the second information processing system, from the original output information output by the first or third information processing resources, to the updated output information output by the first or second information processing resources.

10. A non-transitory computer readable recording medium storing a software update control program causing a computer to execute:
first execution control processing of performing control in such a way that, when a second information processing system processes original output information output by first information processing resources included in a first information processing system executing software before update, second information processing resources included in the second information processing system execute the software being updated;
verification processing of verifying a trial operation in which the second information processing system processes information output by the second information processing resources executing the updated software;
transfer control processing of performing control in such a way that, when a verification result by the verification processing with respect to the trial operation indicates being normal, a state of outputting the original output information is transferred from the first information processing resources to third information processing resources included in the second information processing system, and the second information processing system is able to process the original output information output by the third information processing resources;
second execution control processing of performing control in such a way that, after processing by the transfer control processing is performed, the first information processing resources output updated output information by executing the updated software; and
switching processing of switching processing target information being a processing target of the second information processing system, from the original output information output by the first or third information processing resources, to the updated output information output by the first or second information processing resources.

* * * * *